(12) United States Patent
Hisatsugu et al.

(10) Patent No.: US 8,384,687 B2
(45) Date of Patent: Feb. 26, 2013

(54) MANIPULATION INPUT APPARATUS

(75) Inventors: Shinsuke Hisatsugu, Kariya (JP);
Masahiro Itoh, Ichinomiya (JP);
Kazunobu Nakanishi, Anjo (JP)

(73) Assignee: Denso Corporation, Kariya-City,
Aichi-Pref (JP)

( * ) Notice: Subject to any disclaimer, the term of this patent is extended or adjusted under 35 U.S.C. 154(b) by 738 days.

(21) Appl. No.: 12/542,967

(22) Filed: Aug. 18, 2009

(65) Prior Publication Data

US 2010/0045624 A1 Feb. 25, 2010

(30) Foreign Application Priority Data

Aug. 21, 2008 (JP) ................................ 2008-212693
Sep. 25, 2008 (JP) ................................ 2008-246262
Sep. 29, 2008 (JP) ................................ 2008-251784

(51) Int. Cl.
*G06F 3/045* (2006.01)
(52) U.S. Cl. .......................... 345/174; 345/175; 345/176
(58) Field of Classification Search .......... 345/173–179; 178/18.01–18.07, 19.01–19.07
See application file for complete search history.

(56) References Cited

U.S. PATENT DOCUMENTS

| | | | |
|---|---|---|---|
| 5,680,154 | A | 10/1997 | Shiga et al. |
| 5,877,749 | A | 3/1999 | Shiga et al. |
| 6,360,622 | B1 | 3/2002 | Shibata |
| 8,164,574 | B2* | 4/2012 | Matsumoto et al. .......... 345/173 |
| 2007/0143010 | A1 | 6/2007 | Jensfelt |
| 2007/0262970 | A1* | 11/2007 | Matsumoto et al. .......... 345/173 |
| 2008/0180402 | A1* | 7/2008 | Yoo et al. .................... 345/173 |

FOREIGN PATENT DOCUMENTS

| | | |
|---|---|---|
| JP | 5-298013 | 11/1993 |
| JP | 7-181051 | 7/1995 |
| JP | 7-298013 | 11/1995 |
| JP | 2000-75980 | 3/2000 |
| JP | 2000-347807 | 12/2000 |
| JP | 2002-5678 | 1/2002 |
| JP | 2002-157063 | 5/2002 |
| JP | 2002-213989 | 7/2002 |
| JP | 3982184 | 8/2002 |
| JP | 2004-362428 | 12/2004 |
| JP | 2005-82029 | 3/2005 |
| JP | 2006-126997 | 5/2006 |
| JP | 2006-252093 | 9/2006 |

(Continued)

OTHER PUBLICATIONS

Japanese Office Action dated Dec. 14, 2010, issued in corresponding Japanese Application No. 2008-212693 with English Translation.

(Continued)

*Primary Examiner* — Vijay Shankar
(74) *Attorney, Agent, or Firm* — Nixon & Vanderhye PC

(57) ABSTRACT

A manipulation input apparatus includes a panel member, strain gauges, and a controller. The panel member has a front surface functioning as a manipulation input surface to which an input is executed by touch manipulation. The strain gauges detect a load which is applied to the panel member. The controller calculates a position to which a load is applied based on load detection result by the strain gauges. A stick as a convex-shaped structural section is further arranged and integrated in the manipulation input surface of the panel member such that an upward load against the panel member is applied via the stick.

16 Claims, 27 Drawing Sheets

FOREIGN PATENT DOCUMENTS

JP  2008-033408  2/2008

OTHER PUBLICATIONS

Japanese Office Action dated May 26, 2011, issued in corresponding Japanese Application No. 2008-212693 with English Translation.

English translation of Japanese Office Action dated Sep. 9, 2010, issued in corresponding Japanese Application No. 2008-251784.

Japanese Office Action dated Aug. 8, 2011, issued in corresponding Japanese Application No. 2008-212693 with English Translation.

* cited by examiner

| SELECT MENU | | SWITCH FILES... | | |
|---|---|---|---|---|
| INCLINE UP | 【CD】 ↑ | PRESS/ PULL | UP | DOWN |
| INCLINE RIGHT | 【FM】 → | PRESS/ PULL | UP | DOWN |
| INCLINE LEFT | 【AM】 ← | PRESS/ PULL | UP | DOWN |
| INCLINE DOWN | 【MP3】 ↓ | PRESS/ PULL | UP | DOWN |

FIG. 7A
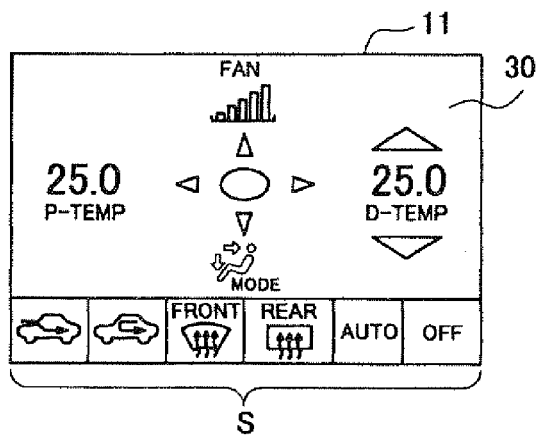
FIG. 7C
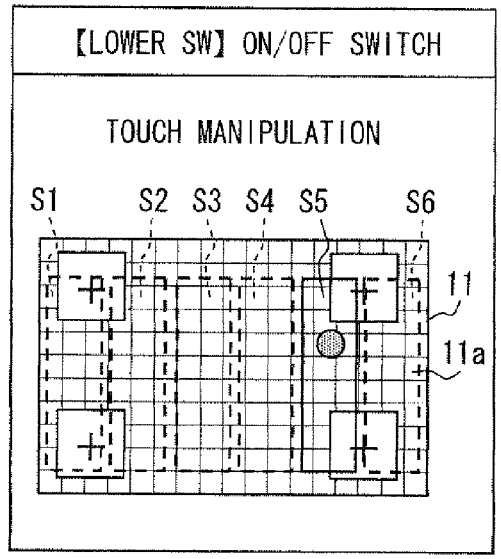
FIG. 7B

FIG. 8A
FIG. 8C
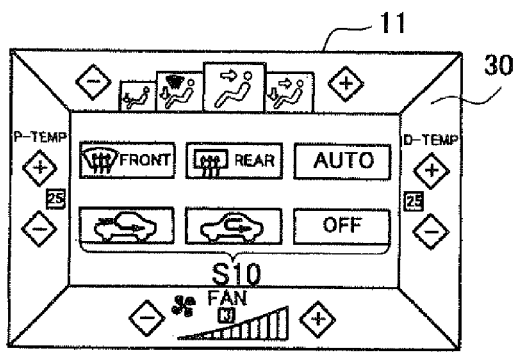
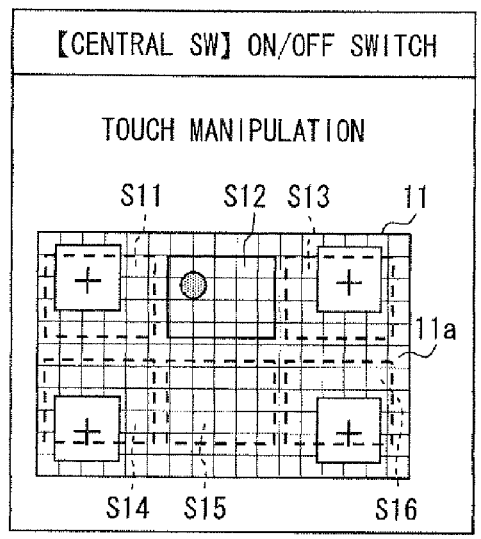
FIG. 8B
| ① SELECT FUNCTION | | | ② ADJUST/SWITCH |
|---|---|---|---|
| INCLINE UP | 【MODE】 ↑ | PRESS/ PULL | MODE SWITCH |
| INCLINE RIGHT | 【D-TEMP.】 → | PRESS/ PULL | UP    DOWN |
| INCLINE LEFT | 【P-TEMP.】 ← | PRESS/ PULL | UP    DOWN |
| INCLINE DOWN | 【BLOW AMOUNT】 ↓ | PRESS/ PULL | UP    DOWN |

MANIPULATION INPUT APPARATUS

CROSS REFERENCE TO RELATED APPLICATION

The present application is based on and incorporates herein by reference Japanese Patent Applications No. 2008-212693 filed on Aug. 21, 2008, No. 2008-246262 filed on Sep. 25, 2008, and No. 2008-251784 filed on Sep. 29, 2008.

FIELD OF THE INVENTION

The present invention relates to a manipulation input apparatus having a panel member for receiving a touch manipulation.

BACKGROUND OF THE INVENTION

[Patent document 1] JP-H5-298013 A
[Patent document 2] JP-H7-298013 A
[Patent document 3] JP-H7-319618 A (corresponding to U.S. Pat. No. 5,877,749)
[Patent document 4] JP-2001-43011 A (corresponding to U.S. Pat. No. 6,360,622)
[Patent document 5] JP 2002-157063 A
[Patent document 6] JP-2006-126997 A
[Patent document 7] JP-2006-252093 A Patent documents 1 to 6 describe manipulation input apparatuses for in-vehicle apparatuses such as a car navigation apparatus. In manipulation input apparatuses, a load of manipulation input applied to an input section is detected by several load sensors such as strain gauges accompanying the input section; the direction and position of the manipulation input is determined based on detection values from the load sensors.

Furthermore, for example, Patent document 6 describes a manipulation input apparatus, in which pressure sensors are arranged at the four corners of the rear surface of a touch panel member, and not only the position (X-Y coordinates) of the depressed touch panel member but also the downward pressure (+Z direction) is detected based on the load detected by the pressure sensors. In addition, Patent document 7 describes a manipulation input apparatus in which calculation of a contact force of a finger or touch pen with a touch panel member uses information on moment generated on the touch panel member by friction between the finger or the like and the touch panel member.

In the manipulation input apparatus of Patent document 6, the depression load or pressing-down load (+Z direction) against the touch panel member can be detected, but the pulling-up load (-Z direction) against the touch panel member cannot be detected. In addition, in the manipulation input apparatus of Patent document 7, the information on moment generated on the touch panel member is used, thus, the ingredient of load which acts on -Z direction is indirectly used in calculating the contact force; however, the load which acts on -Z direction of the touch panel member is not directly used. As a result, the conventional manipulation input apparatuses typically use only the depression load (+Z direction) against the touch panel member substantively, thus tending to restrict manipulation modes in the touch panel member.

SUMMARY OF THE INVENTION

The present invention is made in consideration of the above problem. It is thus an object to provide a manipulation input apparatus to improve manipulation modes in which a touch manipulation is applied to a panel member for receiving touch manipulation inputs.

To achieve the above object, according to an example of the present invention, a manipulation input apparatus is provided as follows. A panel member is provided to have a front surface exposed toward an outside, the front surface functioning as a manipulation input surface, on which a load is applied toward an inside of the panel member in association with an input by a touch manipulation. A load detection section is configured to detect a load, which is applied to the panel member. A calculation section is configured to calculate a load position, to which a load is applied, based on the load detected by the load detection section. A structural section is configured to apply a load to the panel member toward the outside, the structural section being integrated with the panel member.

In the above manipulation input apparatus, the structural section is provided to able to apply an outward load (e.g., an upward load if the panel member is arranged horizontally) against the outside surface or front surface of the panel member whose outside surface functions as a manipulation input surface for receiving a touch manipulation input. Thus, the outward load (-Z direction) can be applied using or via the structural section; the load having the direction in which the panel member is pulled outward can be detected by the load detection section. That is, the above manipulation input apparatus allows the detection of the two directional loads, namely, both the load pressing inward the panel member (load of +Z direction) and the load pulling outward the panel member. Thereby, the load information of the ±Z directions can be effectively used, increasing the manipulation modes in the panel member.

BRIEF DESCRIPTION OF THE DRAWINGS

The above and other objects, features, and advantages of the present invention will become more apparent from the following detailed description made with reference to the accompanying drawings. In the drawings:

FIGS. 7A to 7C are diagrams illustrating examples of manipulation modes of the manipulation input apparatus of FIG. 1A;

FIGS. 8A to 8C are diagrams illustrating examples of manipulation modes of the manipulation input apparatus of FIG. 1A;

DETAILED DESCRIPTION OF THE PREFERRED EMBODIMENTS

First Embodiment

Figure 1A:
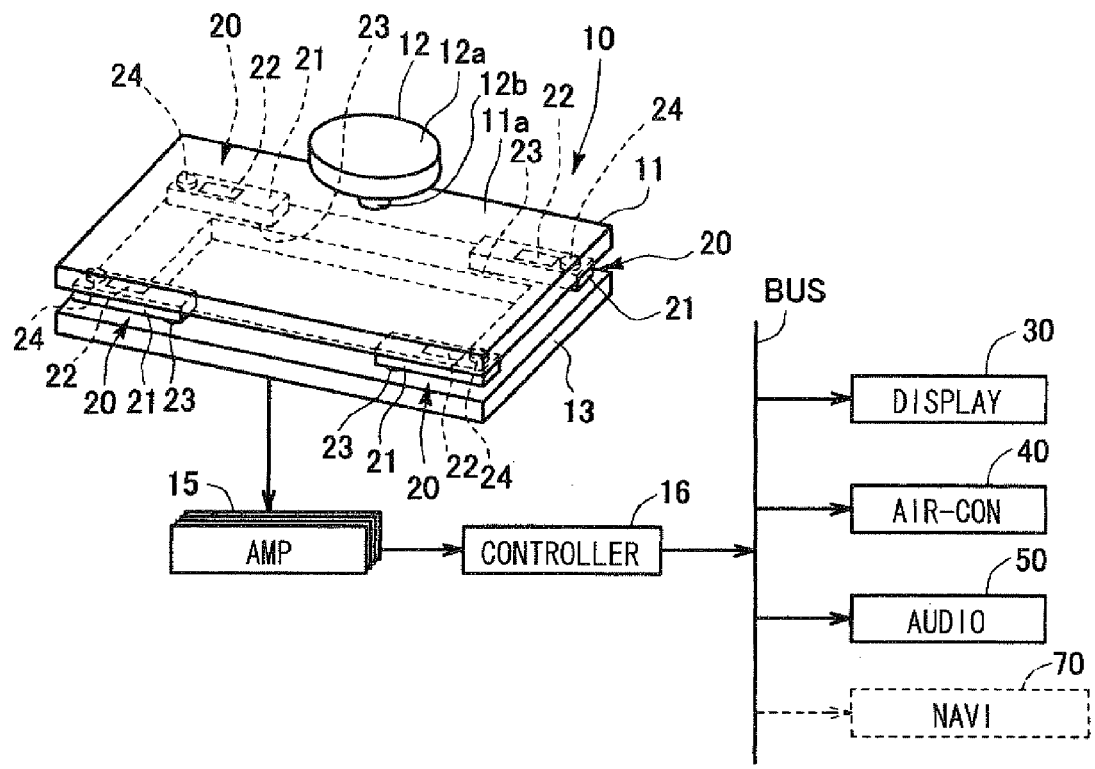
FIG. 1A is a view illustrating an overall configuration of a manipulation input apparatus according to first to third embodiments of the present invention.
Figure 2:
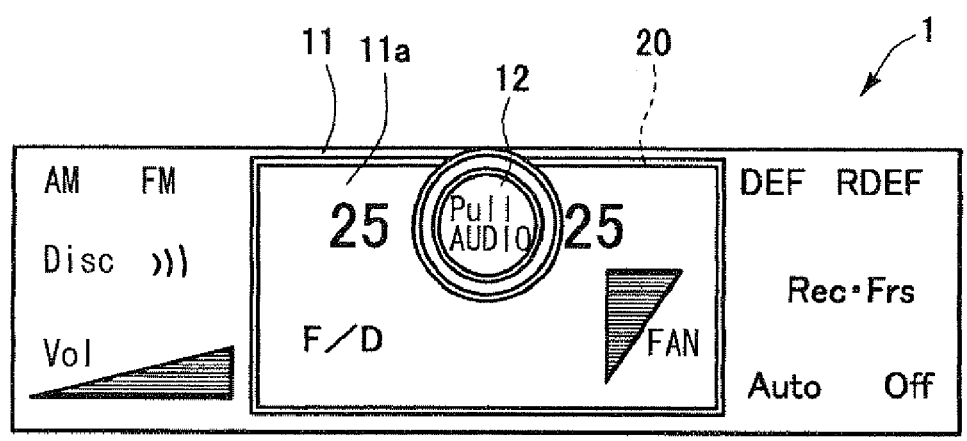
FIG. 2 is a front view of an operation panel to which the manipulation input apparatus of FIG. 1A is applied.

The following describes an embodiment of the present invention with reference to drawings. FIG. 1A illustrates an overall configuration of a manipulation input apparatus 10 according to a first embodiment of the present invention. This manipulation input apparatus 10 is applicable to an operation panel 1 provided in an instrument panel of a vehicle, for example, as illustrated in FIG. 2. The operation panel 1 is used for operating an air-conditioner 40 and an audio apparatus 50.

Figure 1B:
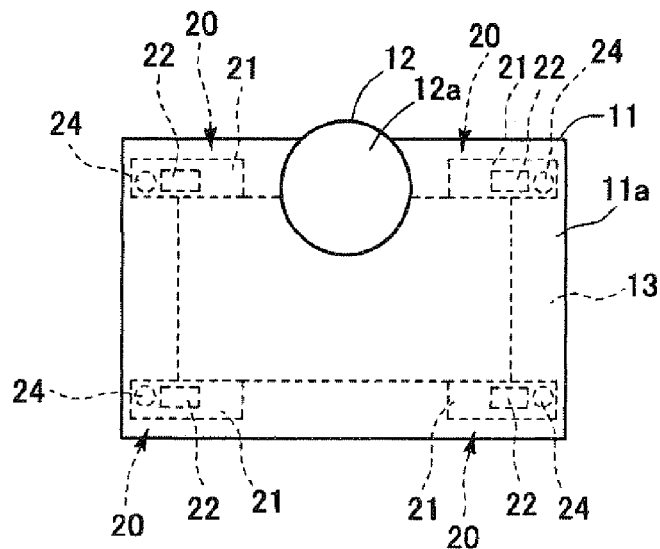
FIG. 1B is a plan view of the manipulation input apparatus.

The manipulation input apparatus 10 is provided with a panel member 11, a stick 12, a frame 13, and strain gauge type sensors 20, as illustrated in FIGS. 1A and 1B. In FIG. 1A, the upper side corresponds to the front side (i.e., front surface) or outside (i.e., outside surface) of the manipulation input apparatus 10 while the lower side corresponds to the rear side or inside of the manipulation input apparatus 10. The front side signifies the side facing a user or operator of the manipulation input apparatus. The panel member 11 has a rectangular shape, for example; the panel member 11 is configured of a plate member, for example, made of a transparent acrylic resin. The front surface or outside surface of the panel member 11 is exposed towards an outside of the manipulation input apparatus 10, namely towards an occupant seat while functioning as a manipulation input surface 11a, where a pressing-down manipulation is performed to depress or press down a point or a drag manipulation is performed to move while touching.

The stick 12 is referred to as a structural section or a protruding (convex-shaped) member. The stick 12 has a cylindrical grip portion 12a and a shaft portion 12b as a single body. The shaft portion 12b is extended downward from the rear-side of the grip portion 12a in FIG. 1A. The lower end of the shaft portion 12b is fixed to the manipulation input surface 11a in FIG. 1A. Thus, it may be expressed that the stick 12 is rigidly integrated with the panel member 11.

The frame 13 has a rectangular shape having the almost same area dimensions as those of the panel member 11. Inside the frame 13, a display section 30 (for example, a liquid crystal display etc.) is arranged so as to display as images operation items of the air-conditioner 40 and audio apparatus 50.

The strain gauge type sensors 20 may be referred to as load detection units or collectively referred to as a load detection section. The stain gauge type sensors 20 are arranged at the corners of the panel member 11 and sandwiched between the panel member 11 and the frame 13. Each strain gauge type sensor 20 is provided with an elastic beam member 21 and a strain gauge 22. The elastic beam member 21 is shaped of a rectangle rod form. The elastic beam member 21 is arranged along a long side of the panel member 11 while being connected to the upper surface of the frame 13 via a spacer 23 at one end and being connected to the rear surface (i.e., inside surface) of the panel member 11 via a spacer 24.

In detail, the two adjoining elastic beam members 21 arranged along the same long side of the panel member 11 are prolonged so as to approach each other. Each elastic beam member 21 is bonded to the rear surface of the panel member 11 around a vertex of the rectangle panel member 11 using the spacer 24 while being bonded to the upper surface of the frame 13 around the intermediate position of the long side of the panel member 11 using the spacer 23. That is, the length of the elastic beam member 21 is secured by using the long side of the panel member 11 having the rectangular shape. Even if the manipulation load applied to the panel member 11 is comparatively small, the elastic beam member 21 comparatively greatly bends to thereby exhibit a significant flexure deformation.

Each strain gauge 22 is attached on an upper surface located in an intermediate position of the elastic beam member 21. The strain gauge 22 follows the flexure deformation of the elastic beam member 21 to thereby receive an in-plane strain and vary an electric resistance value. The stain gauge 22 is supplied with a detection voltage. The load applied to the panel member 11 is extracted as a variation in the resistance value and eventually as a voltage value (load detection voltage) in the strain gauge 22.

When an operator performs a pressing-down manipulation (also referred to as a depression manipulation or pressing-inward manipulation) to press inward (or press down in FIG. 1A) the panel member 11 directly or indirectly via the stick 12, each elastic beam member 21 is subjected to an elastic deformation such that the upper surface bends in a convex form with the spacer 23 serving as a fulcrum or supporting point in FIG. 1A. In contrast, when an operator performs a pulling-up manipulation (also referred to an a pulling-outward manipulation) to pull outward (or pulling up in FIG. 1A) the panel member 11 via the stick 12, each elastic beam member 21 is subjected to an elastic deformation such that the upper surface bends in a concave form.

When the elastic deformation arises such that the upper surface of the elastic beam member 21 bends in the convex form, the load detection voltage of a positive (+) value is extracted from the strain gauge 22 as a sensor output value. When the elastic deformation arises such that the upper surface of the elastic beam member 21 bends in the concave form, the load detection voltage of a negative (−) value is extracted from the strain gauge 22 as a sensor output value. A resistance detection circuit is thus configured so as to achieve the above-mentioned electrical detection function. The load detection voltages outputted from the strain gauges 22 are amplified by amplifying circuits 15, respectively, and inputted to the control circuit 16 (also referred to a controller or calculation section).

The control circuit 16 mainly includes a microcomputer containing a CPU, a ROM, a RAM, an input and output (I/O) section, and a communication interface, all of which are connected with an internal bus. The CPU of the control circuit 16 executes a position calculation program stored in the ROM.

That is, the CPU of the control circuit 16 executes a position calculation process based on the load detection voltage from each strain gauge 22. The position calculation process obtains a load position in the coordinate plane corresponding to the manipulation input surface 11a of the panel member 11, a drag direction on the manipulation input surface 11a, and a strength or magnitude of a load. The result of the position calculation process is transmitted to various ECUs (Electronic Control Units) such as ECUs of the air-conditioner 40 and the audio apparatus 50 via a communication bus such as a serial communication bus including CAN (Controller Area Network) or LIN (Local Interconnect Network).

Figure 3A:
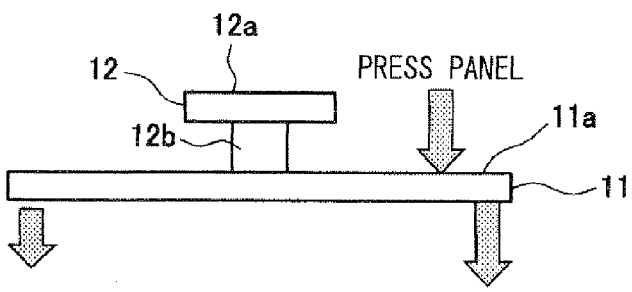
FIGS. 3A to 3E are diagrams illustrating manipulation modes of the manipulation input apparatus of FIG. 1A.
Figure 3B:
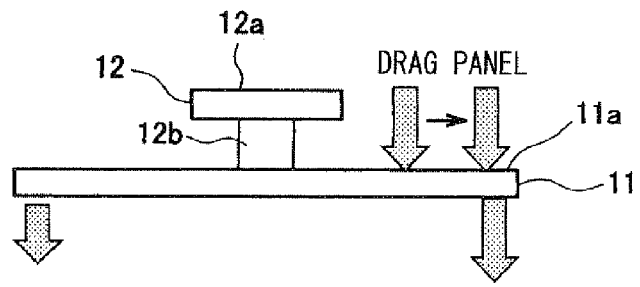
Figure 3C:
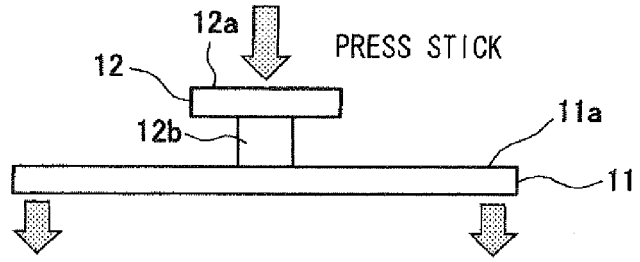
Figure 3D:
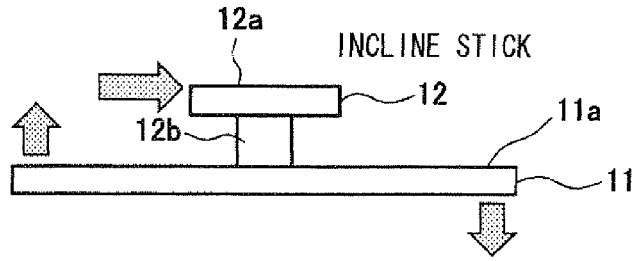
Figure 3E:
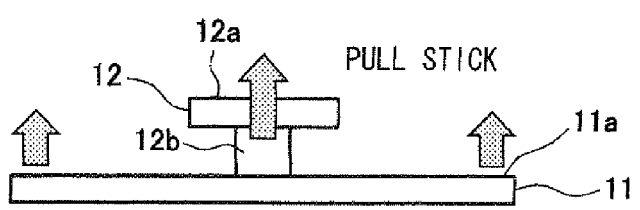
Figure 4A:
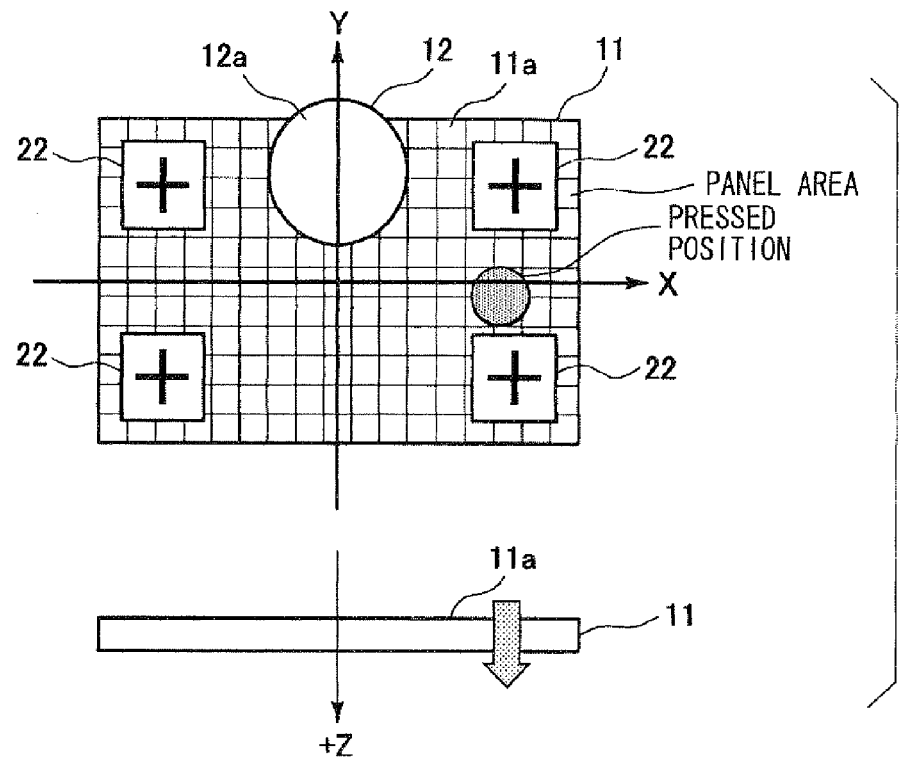
FIGS. 4A to 4E are diagrams illustrating load detection voltages extracted from strain gauges in association with the manipulation modes of FIGS. 3A to 3E.

The following explains load detection voltages, which are extracted from the strain gauges 22 in association with manipulation modes using the panel member 11 or the stick 12 with reference to FIGS. 3A to 3E, FIGS. 4A to 4E, and FIGS. 5A and 5B. When an operator or user performs a pressing-down manipulation to depress the panel member 11 as shown in FIG. 3A, each elastic beam member 21 is subjected to an elastic deformation such that its upper surface bends in a convex form. Therefore, all the load detection voltages extracted from the strain gauges 22 become positive (+) (FIG. 4A). Furthermore, in FIGS. 4A to 4E, +Z and −Z directions of the thickness direction, which is orthogonal to the manipulation input section 11a of the panel member 11 are defined as follows. That is, +Z direction corresponds to the direction in which the panel member 11 is depressed inward (i.e., downward in FIGS. 3A to 3E) while corresponding to the load detection voltage, which is extracted from the strain gauge 22, of a positive (+) value. In contrast, −Z direction corresponds to the direction in which the panel member 11 is pulled outward (i.e., upward in FIGS. 3A to 3E) while corresponding to the load detection voltage of a negative (−) value.

The manipulation load added to the panel member 11 can be obtained by totaling the load detection voltages of all the strain gauges 22.

Figure 5:
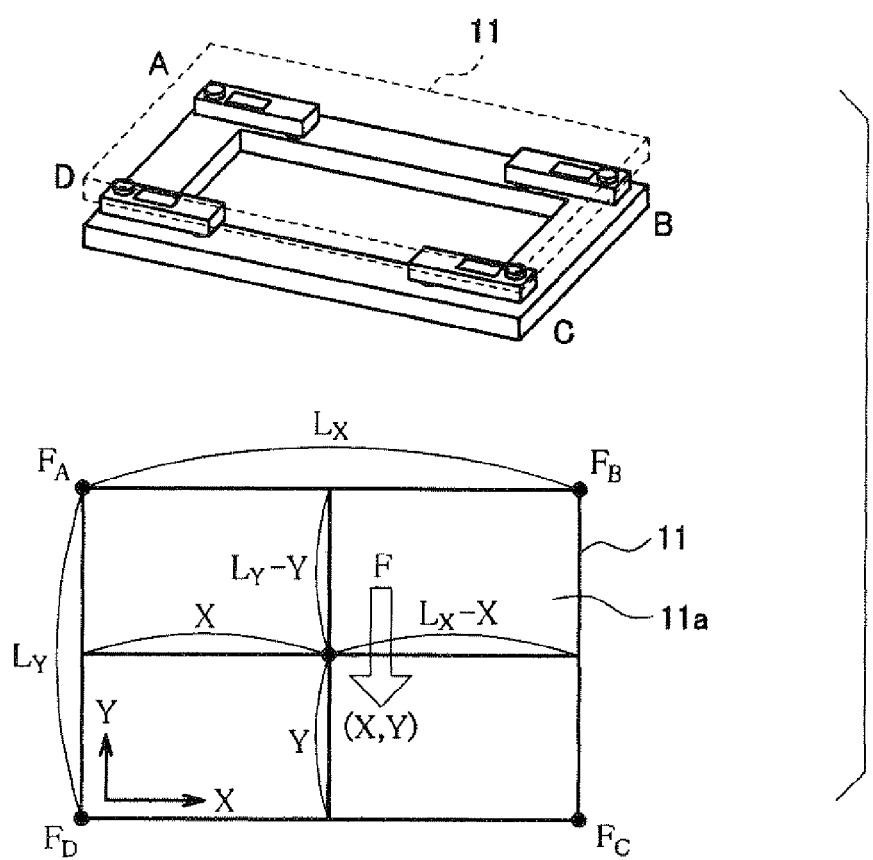
FIG. 5 is a diagram for schematically explaining a calculation of a load position (barycentric coordinates) based on load detection voltages from each strain gauge.

Further, as illustrated in FIG. 5, X direction is defined as a direction in which the long side of the manipulation input surface 11a extends while LX is defined as the length of the long side of the manipulation input surface 11a. In contrast, Y direction is defined as a direction in which the short side of the manipulation input surface 11a extends while LY is defined as the length of the short side of the manipulation input surface 11a. Now, the following explains on the assumption that a manipulation load is applied to the point having the coordinates (X, Y). In this case, the load detection voltage (distribution load) extracted from the strain gauge 22 located in the vertex A, B, C, or D of the manipulation input surface 11a, is defined, respectively, as FA, FB, FC, or FD. The manipulation load F applied to the panel member 11 is expressed by the following formula (1).

$$F=FA+FB+FC+FD \qquad \text{Formula (1)}$$

In addition, the coordinates (X, Y) (barycentric coordinates of the manipulation load F) can be obtained as follows.

That is, the ratio FA:FD and the ratio FB:FC of the distribution loads in Y direction are equal to each other while the ratio FA:FB and the ratio FD:FC of the distribution loads in X direction are also equal to each other. Thus, on the assumption that FY1=FC+FD, FY2=FA+FB, FX1=FA+FD, and FX2=FB+FC, according to the leverage relation, the following formulas (2) and (3) are obtained with respect to Y direction.

$$FY2/FY1=Y/(LY-Y) \qquad \text{Formula (2)}$$

$$Y=FY2*LY/(FY1+FY2)=(FA+FB)*LY/(FA+FB+FC+FD) \qquad \text{Formula (3)}$$

Similarly, the following formulas (4) and (5) are obtained with respect to X direction.

$$FX2/FX1=X/(LX-X) \qquad \text{Formula (4)}$$

$$X=FX2*LX/(FX1+FX2)=(FB+FC)*LX/(FA+FB+FC+FD) \qquad \text{Formula (5)}$$

Namely, as illustrated in the above formulas (3) and (5), the barycentric coordinates (X, Y) can be uniquely calculated using the load detection voltages (distribution loads) FA, FB, FC, and FD extracted from the respective strain gauges 22.

Further, when the manipulation load F is positive and the barycentric coordinates (X, Y) is within the panel area indicated by the cross lines in FIG. 4A, it can be determined that the panel member 11 is subjected to the depressing manipulation, i.e., the panel member 11 is pressed downward.

Figure 4B:
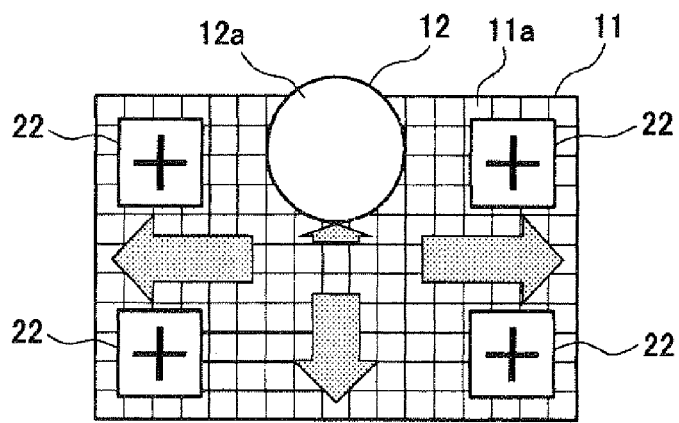
Figure 4C:
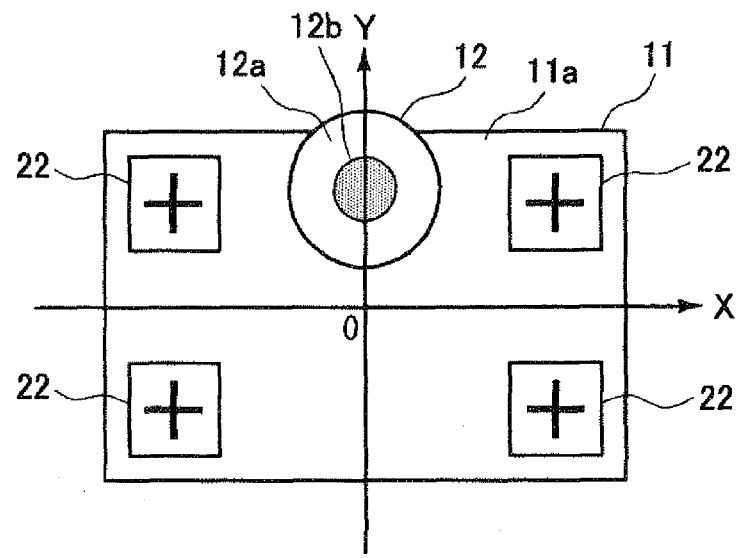

When an operator performs a drag manipulation to track or scrub (i.e., move in touch with) the manipulation input surface 11a of the panel member 11 as illustrated in FIG. 3B, all the load detection voltages extracted from the strain gauges 22 also become positive (+). However, the load detection voltage of each strain gauge 22 changes every moment during the drag manipulation. The obtained barycentric coordinates (x, y) therefore has a value also changing every moment. Therefore, the barycentric coordinates (X, Y) corresponding to the start position and the end position of the drag manipulation are obtained to thereby specify the drag direction (FIG. 4B). In addition, the sum total of the load detection voltage by each strain gauge 22 from the start position to the end position of the drag manipulation is made to thereby specify the quantity of the pressing-down manipulation against the panel member 11 during the drag manipulation.

Also when an operator performs a depression manipulation to press downward the stick 12 (see FIG. 3C), all the load detection voltages extracted from the strain gauges 22 also become positive (+). It is noted that in the above case, the obtained barycentric coordinates (X, Y) almost accords with the center position of the shaft portion 12b of the stick 12 indicated as the black dot in FIG. 4C. It can be thus determined that the panel member 11 is subjected to the depression manipulation (i.e., pressing-down manipulation) using the stick 12, i.e., the stick 12 is pressed downward. In addition, the quantity of the pressing-down manipulation of the stick 12 can be specified by obtaining the sum total of the load detection voltages from the respective strain gauges 22.

Figure 4D:
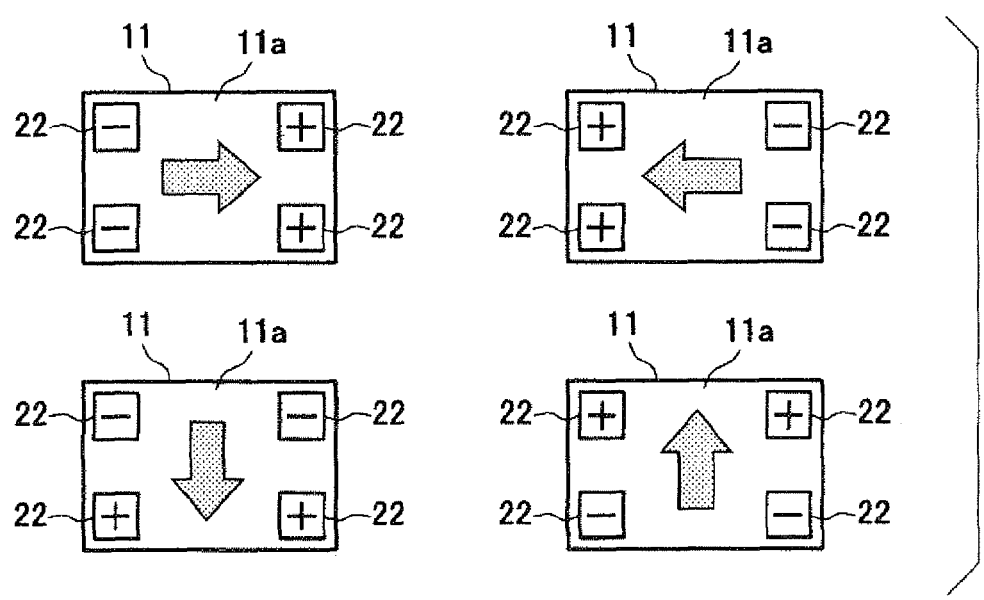

In contrast, when an operator performs an inclination manipulation to incline the stick 12 (see FIG. 3D), each load detection voltage extracted from each strain gauge 22 becomes positive or negative depending on the inclination direction (FIG. 4D). Therefore, the group or pair of the strain gauges 22 from which the load detection voltages of positive values, and the group or pair of the strain gauges from which the load detection voltages of negative values are determined to thereby determine the inclination manipulation and result in specifying the inclination direction. In addition, the quantity of the inclination manipulation of the stick 12 can be specified by obtaining a ratio between the sum totals of the load detection voltages of positive values and the sum total of the load detection voltages of negative values.

Figure 4E:
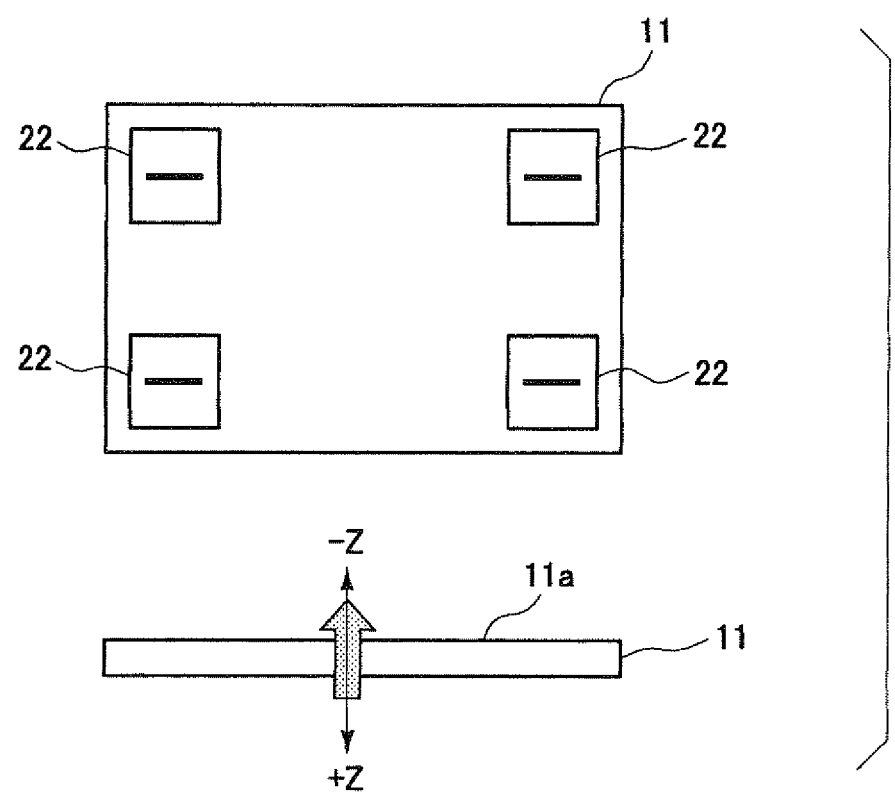

When an operator performs a pulling-up manipulation to pull upward the stick 12, all the load detection voltages extracted from the strain gauges 22 also become negative (−) (FIG. 4E). It can be thus determined that the stick 12 is subjected to the pulling-up manipulation, i.e., the stick 12 is pulled upward. In addition, the quantity of the pulling-up manipulation of the stick 12 can be specified by obtaining the sum total of the load detection voltages of negative values from the respective strain gauges 22.

In the operation panel 1 of FIG. 2, to which the above-mentioned manipulation input apparatus 10 is applied, the following configuration is provided. When the pressing-down manipulation equal to or greater than a predetermined threshold value is applied to the stick 12, an operation menu of the air-conditioner 40 is displayed in the display section 30. When the pulling-up manipulation equal to or greater than a predetermined threshold value is applied to the stick 12, an operation menu of the audio apparatus 50 is displayed in the display section 30.

Figures 6A, 6B:
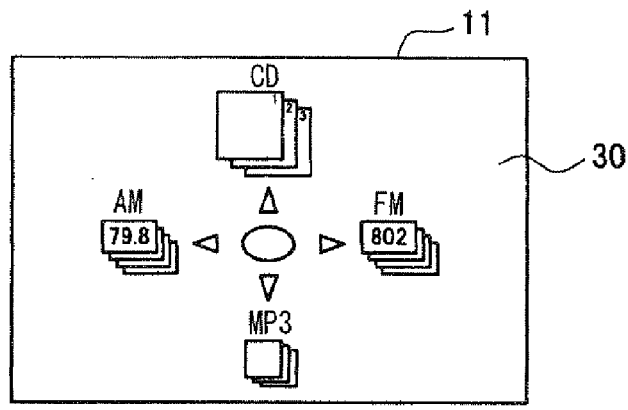
FIGS. 6A to 6B are diagrams illustrating examples of manipulation modes of the manipulation input apparatus of FIG. 1A.

FIG. 6A shows an example of an operation menu of the audio apparatus 50 in the display section 30 when the pulling-up manipulation equal to or greater than a predetermined threshold value is applied to the stick 12. In this example, as illustrated in FIG. 6B, a CD reproduction function can be selected, for example, by inclining the stick 12 upward in FIG. 2. If the stick 12 is pressed downward or pulled upward in the state where the CD reproduction function is selected, an index of the CD to play can be changed or audio volume can be changed.

In addition, a radio function (FM, AM) can be selected, for example by inclining the stick 12 to right or left in FIG. 2. If the stick 12 is pressed downward or pulled upward in the state where the radio function is selected, a receiving channel can be changed or audio volume can be changed. Further, an MP3 reproduction function can be selected, for example, by inclining the stick 12 downward in FIG. 2. If the stick 12 is pressed downward or pulled upward in the state where the MP3 reproduction function is selected, an MP3 file to play can be changed or audio volume can be changed.

In the pressing-down/pulling-up manipulation of the stick 12 illustrated in above FIG. 6B, when the applied load is equal to or greater than a predetermined value (namely, load detection voltage), it can be set such that the switching speed according to each menu becomes quicker as compared with the case of less than the predetermined value.

FIG. 7A shows an example of an operation menu of the air-conditioner 40 in the display section 30 when the pressing-down manipulation equal to or greater than a predetermined threshold value is applied to the stick 12. In this example, as illustrated in FIG. 7B, a blow amount setting function can be selected, for example, by inclining the stick 12 upward in FIG. 2. When the stick 12 is pulled upward or pressed downward in the state where the blow amount setting function is selected, the air blow amount can be increased or decreased accordingly.

In addition, a driver-seat temperature or a fellow passenger-seat temperature setting function can be selected, for example by inclining the stick 12 to right or left in FIG. 2. When the stick 12 is pulled upward or pressed downward in the state where either the driver-seat or passenger-seat temperature setting function is selected, the corresponding temperature can be increased or decreased accordingly. Further, a blow outlet switching function can be selected, for example, by inclining the stick 12 downward in FIG. 2. When the stick 12 is pulled upward or pressed downward in the state where the blow outlet switching function is selected, the blow outlet can be switched between various kinds of switching positions (for example, FACE mode, FOOT mode, FOOT/DEF mode, etc.).

In the pressing-down/pulling-up manipulation of the stick 12 illustrated in above FIG. 7B, when the applied load is equal to or greater than a predetermined value (namely, load detection voltage), it can be set such that the change speed of the blow amount or temperature or switching speed of blow outlets becomes quicker as compared with the case of less than the predetermined value.

Furthermore, in the example illustrated in above FIG. 7A, in the lower part of the display section 30, the operation switch group S is displayed as containing the various operation switches about the air-conditioning. The manipulation input surface 11a is divided into several manipulation recognition areas (S1 to S6) corresponding to the operation switches of the operation switch group S, as illustrated in FIG. 7C. When the pressing-down manipulation of the panel member 11 is carried out, ON/OFF of the operation switch corresponding to the manipulation recognition area S1 to S6 where the barycentric coordinates obtained belongs, are changed. FIG. 7C illustrates an example of the case where the barycentric coordinates belongs to the manipulation recognition area S5 to thereby enable ON/OFF of the AUTO switch to be switched therebetween.

Similar to FIG. 7A, FIG. 8A shows an example of an operation menu of the air-conditioner 40 in the display section 30 when the pressing-down manipulation equal to or greater than a predetermined value is applied to the stick 12. In this example, as illustrated in FIG. 8B, a blow outlet switching setting function can be selected, for example, by inclining the stick 12 upward in FIG. 2. When the stick 12 is depressed downward or pulled up when the blow outlet switching function is selected, the blow outlet can be changed to one of various kinds of outlets.

In addition, a driver-seat temperature or a fellow passenger-seat temperature setting function can be selected, for example by inclining the stick 12 to right or left in FIG. 2. When the stick 12 is pulled upward or pressed downward in the state where either the driver-seat or passenger-seat temperature setting function is selected, the corresponding temperature can be increased or decreased accordingly. Further, a blow amount setting function can be selected, for example, by inclining the stick 12 downward in FIG. 2. When the stick 12 is pulled upward or pressed downward in the state where the blow amount setting function is selected, the air blow amount can be increased or decreased accordingly.

In the pressing-down/pulling-up manipulation of the stick 12 illustrated in above FIG. 8B, when the applied load is equal to or greater than a predetermined value (namely, load detection voltage), it can be set such that the change speed of the blow amount or temperature or switching speed of blow outlets becomes quick as compared with the case of less than the predetermined value.

Furthermore, in the example illustrated in above FIG. 8A, in the central part of the display section 30, the operation switch group S10 is displayed as containing the various operation switches about the air-conditioning. The manipulation input surface 11a is divided into several manipulation recognition areas (S11 to S16) corresponding to the operation switches of the operation switch group S10, as illustrated in FIG. 8C. When the pressing-down manipulation of the panel member 11 is carried out, ON/OFF of the operation switch corresponding to the manipulation recognition area S11 to S16 where the barycentric coordinates obtained belongs, are changed. FIG. 8C illustrates an example of the case where the barycentric coordinates belongs to the manipulation recognition area S12 to thereby enable ON/OFF of the rear window defogger switch to be switched therebetween.

Figure 9A:
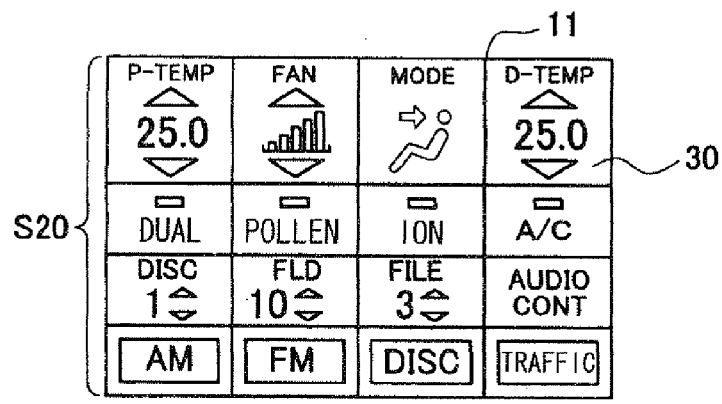
FIGS. 9A to 9B are diagrams illustrating examples of manipulation modes of the manipulation input apparatus of FIG. 1A.
Figure 9B:
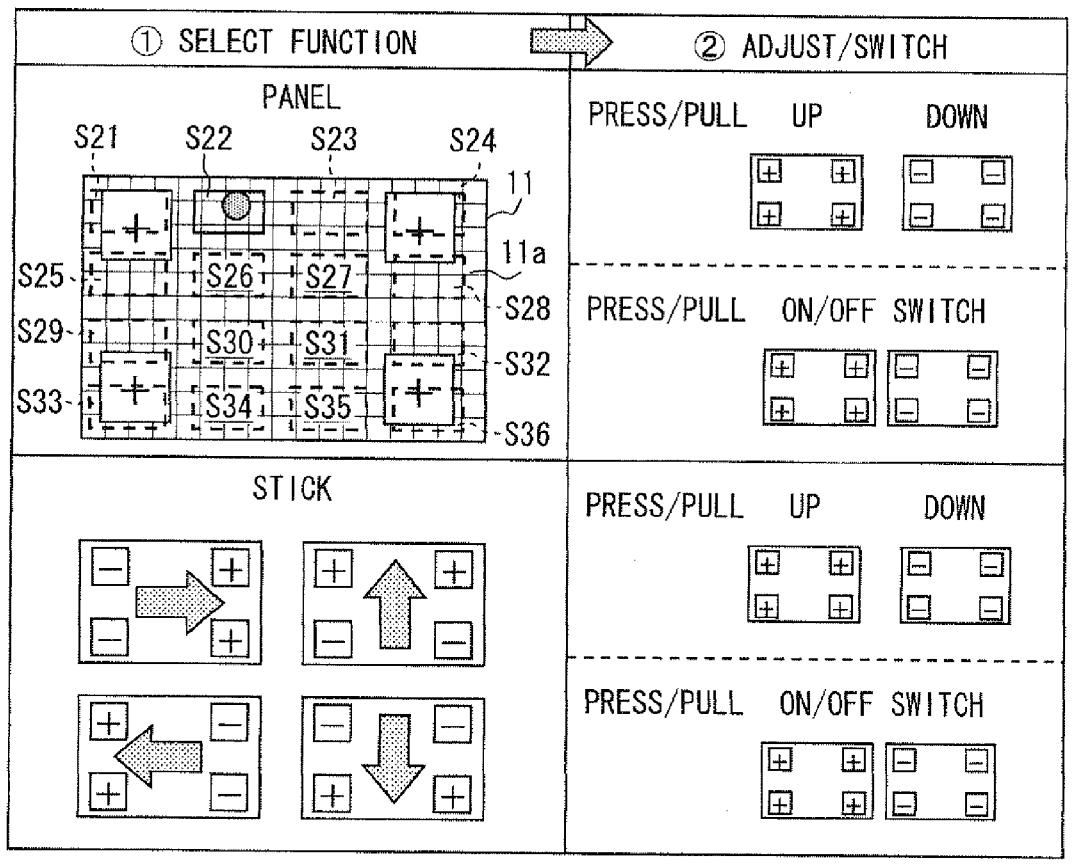

FIG. 9A shows an example of operation menus of the air-conditioner 40 and audio apparatus 50. In this example, as illustrated in FIG. 9B, the various functions can be selected by the pressing-down manipulation applied to the manipulation input surface 11a, while the various functions can be selected also by the inclination manipulation (up/down/left/right) applied to the stick 12. Further, by the pressing-down or pulling-up manipulation of the stick 12 the stick 12, ON/OFF states of the operation switch can be switched or output values can be adjusted in the various functions.

The manipulation input surface 11a is divided into several manipulation recognition areas (S21 to S36) corresponding to the operation switches of the operation switch group S20, as illustrated in FIG. 9B. When the pressing-down manipulation of the panel member 11 is carried out, ON/OFF of the operation switch corresponding to the manipulation recognition area S21 to S36 where the barycentric coordinates obtained belong, are changed. FIG. 9B illustrates an example of the case that the barycentric coordinates belongs to the manipulation recognition area S22, and the air amount is increased or decreased.

Also in the example illustrated in above FIG. 9B, when the load in the depression/pulling-up manipulation of the stick 12 is equal to or greater than a predetermined value (namely, load detection voltage), it can be set such that the change speed of the blow amount or temperature or switching speed of blow outlets becomes quick as compared with the case of less than the predetermined value.

Under the present first embodiment, the detection load information contains both +Z direction which is related with the pressing-down manipulation of the stick 12, and −Z direction which is related with the pulling-up manipulation of the stick 12. Such detection load information can be effectively utilized to thereby expand the manipulation modes well. In addition, the upward load relative to the panel member 11 can be achieved by using the stick; namely, the stick 12 is pulled upward by being held by fingers, for instance, to thereby achieve an easy manipulation.

(Modification)

Figure 10A:
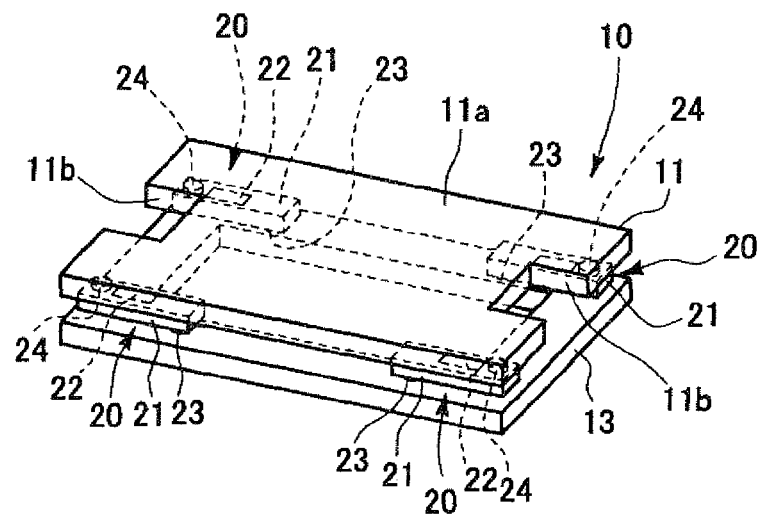
FIG. 10A is a view illustrating an overall configuration of a manipulation input apparatus according to a modification of the first embodiment of the present invention.
Figure 10B:
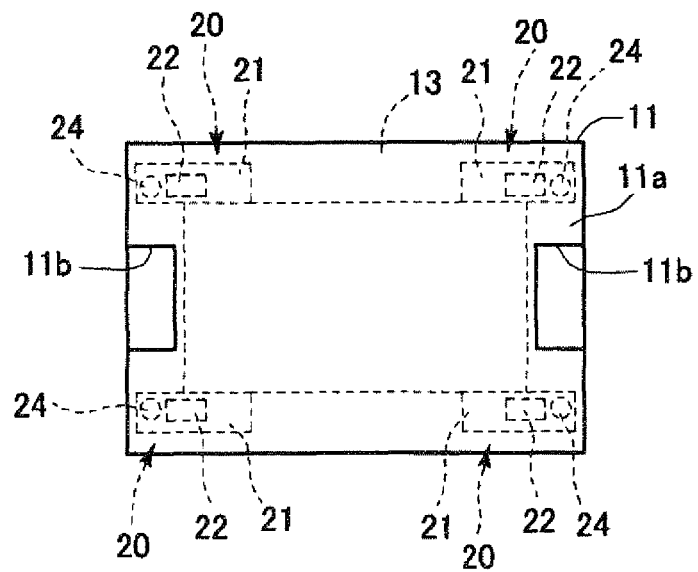
FIG. 10B is a plan view of the manipulation input apparatus of FIG. 10A.

In the above first embodiment, the stick 12 functioning as a structural section is provided on the manipulation input surface 11a of the panel member 11. Instead of such a stick 12, for example, a recess or notched portion (further also referred to as a concave portion) 11b in the panel member 11 may be used as another structural section as illustrated in FIGS. 10A and 10B. The notched portion 11b may be configured so as to be hooked by a finger of an operator. Further, two notched portions 11b may be provided symmetrically close to the short sides of the panel member 11. Furthermore, other configurations are the same as those of the above first embodiment; thus, the comparable components are assigned with the same reference numbers as those in the above embodiment and explanation thereof is omitted.

Also in this modification, an operator can perform an inclination manipulation for the panel member 11 using the notched portions 11b in a manner equivalent to that in FIG. 3D. Further, also in this modification, an operator can perform a pulling-up manipulation for the panel member 11 using the notched portions 11b in a manner equivalent to that in FIG. 3E. In any case, the manipulation is easy. Furthermore, the concave portion need not be limited to the notched portions 11b; further, it may be a hollow provided in the manipulation input surface 11a, for example.

Second Embodiment

Figure 11:
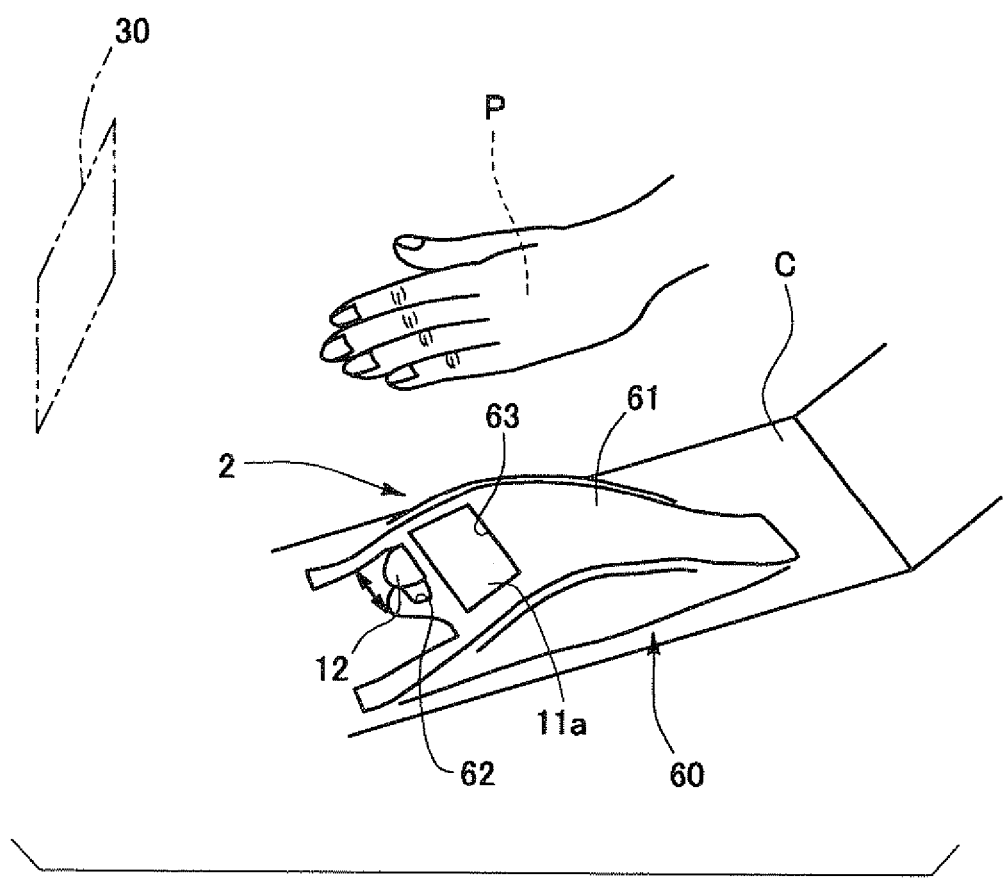
FIG. 11 is an outline view of a remote operation apparatus, to which the manipulation input apparatus of FIG. 1A is applied as a remote input apparatus, according to a second embodiment of the present application.

In the above first embodiment and its modification, the manipulation input apparatus 10 is applied to the operation panel 1, which is provided in the instrument panel of the vehicle; the display section 30 is arranged inside of the frame 13. Alternatively, the manipulation input apparatus 10 can be applied to a remote operation apparatus as a remote input section 2 (also referred to as a remote operation device 2). The remote operation apparatus includes the remote input section 2 and a display section 30, which is arranged in a central portion of the instrumental panel of the vehicle separately from the manipulation input apparatus 10 (i.e., remote input section 2) as illustrated in FIG. 11. While seeing the display section 30 in the instrument panel, an operator performs a remote operation using the manipulation input apparatus 10, positioned at hand of the user or driver in the vehicle.

The remote operation device 2 is arranged at a center console C inside the compartment of the vehicle. The manipulation input apparatus 10 is accommodated inside of the casing 60 which partially constitutes the remote operation device 2. The casing 60 is configured such that the outline of a palm rest portion 61 is swelled in a convex form to enable an operator to put or rest his/her palm P. Ahead of the palm rest portion 61, a stick 12 is protruded upward through an opening 62. A manipulation input surface 11a of a panel member 11 is exposed through an opening window 63.

In the present manipulation input apparatus 10, a functional operation can be performed for a car navigation apparatus 70 in addition to the air-conditioner 40 and the audio apparatus 50. Namely, the CPU of the control circuit 16 executes a calculation process based on the load detection voltage from each strain gauge 22. The calculation process calculates a load position in the coordinate plane corresponding to the manipulation input surface 11a of the panel member 11, a drag direction on the manipulation input surface 11a, and a strength or magnitude of a load. The result of the calculation process is transmitted also to the ECU of the car navigation apparatus 70 via the communication bus.

Figure 12A:
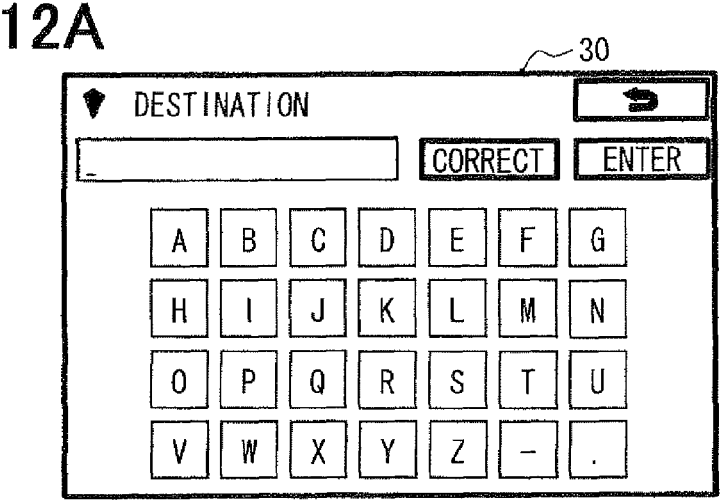
FIGS. 12A to 12E are examples of display windows in a display section in response to manipulation to the remote input apparatus of FIG. 11.
Figure 12B:
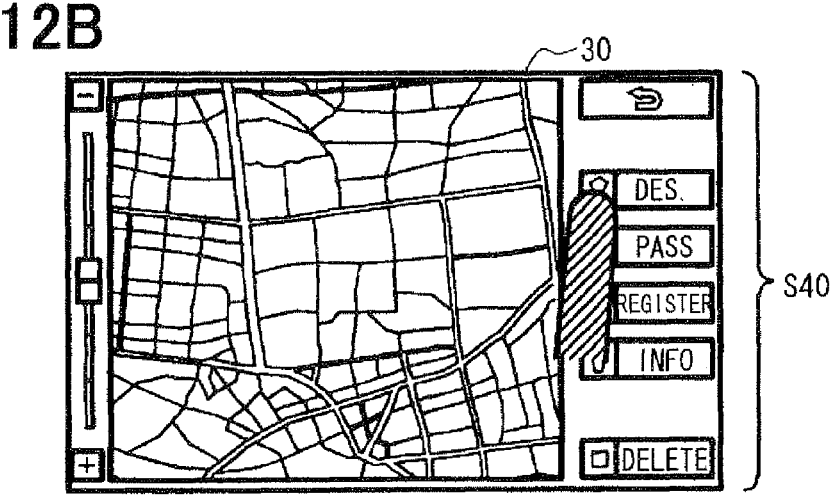

FIGS. 12A and 12B illustrate the operation information or operation items displayed in the display section 30, when a map display setting up function is set up. Pressing-down manipulation is applied to the part of the manipulation input surface 11a of the panel member 11 corresponding to a destination designation button among the operation switch group S40 illustrated in FIG. 12B, thereby switching to a character input window of FIG. 12A. Pressing-down manipulation greater than a predetermined manipulation amount is applied to the part of the manipulation input surface 11a corresponding to the position of a character which is desired to be inputted, thereby determining the character.

The manipulation input surface 11a is divided into several manipulation recognition areas corresponding to the operation switches of the operation switch group S40. The barycentric coordinates is obtained when the pressing-down manipulation of the panel member 11 is carried out; thereby, the function of the operation switch corresponding to the manipulation recognition area where the barycentric coordinates belong becomes valid. At this time, the display section 30 displays an image representing a finger of the operator, cursor, or the like (FIG. 12B).

Figure 12C:
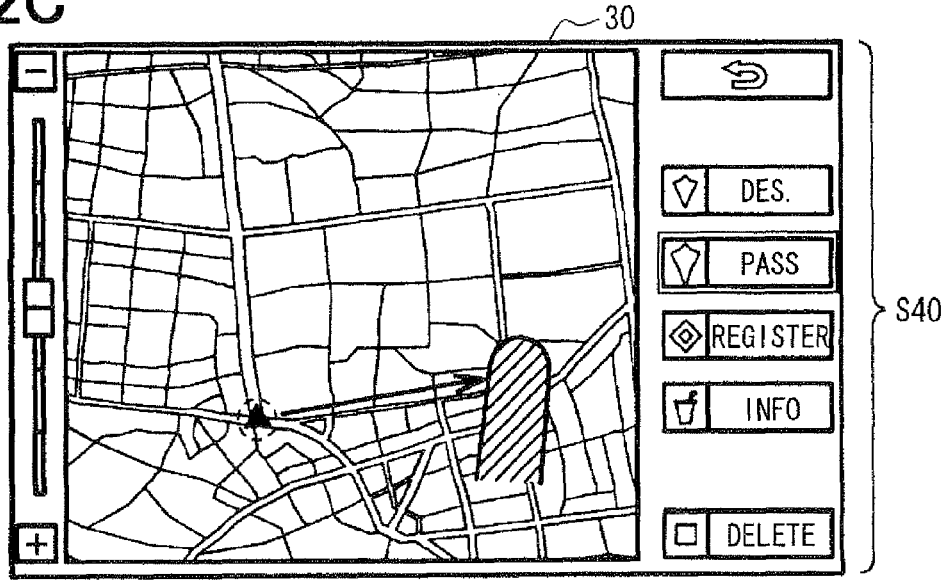

According to the present second embodiment, as illustrated in FIG. 12C, when the operator performs a drag manipulation to scrub (i.e., move in touch with) the manipulation input surface 11a in a direction (referred to as a drag direction), the map is scrolled in the drag direction. Furthermore, also when an inclination manipulation is applied to the stick 12, the map scrolls in association with the inclination direction.

Figure 12D:
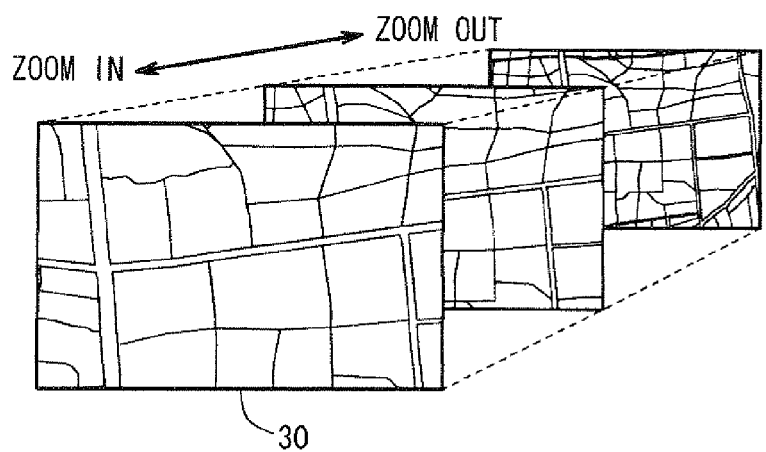
Figure 12E:
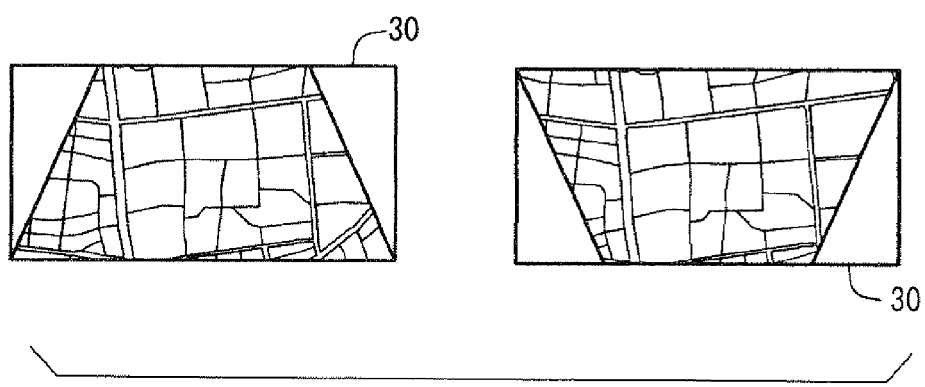

Further, when in the state illustrated in FIG. 12C, the pressing-down manipulation having greater than a predetermined manipulation amount is applied to the stick 12, the map is enlarged (zoomed in) as shown in FIG. 12D. In contrast, the pulling-up manipulation having greater than a predetermined manipulation amount is applied to the stick 12, the map is reduced (zoomed out) as shown also in FIG. 12D. When the applied load (namely, load detection voltage) in the pressing-down/pulling-up manipulation is equal to or greater than a predetermined value, it can be designed such that the switching speed of zooming in/out becomes quicker as compared with the case of less than the predetermined value. Furthermore, when the pressing-down manipulation is applied to the upper part or the lower part of the manipulation input surface 11a, for example, the viewpoint of the map can be changed as illustrated in FIG. 12E.

Third Embodiment

Figure 13A:
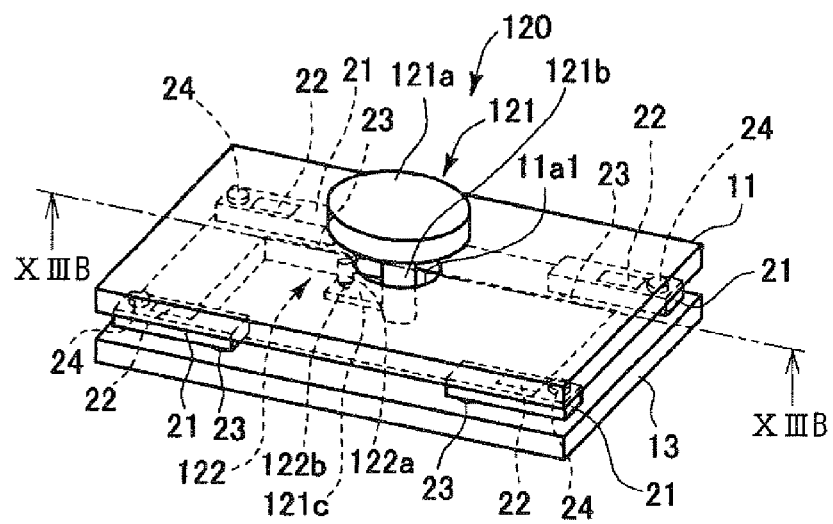
FIG. 13A is a view illustrating an overall configuration of a manipulation input apparatus according to a third embodiment of the present invention.
Figure 13B:
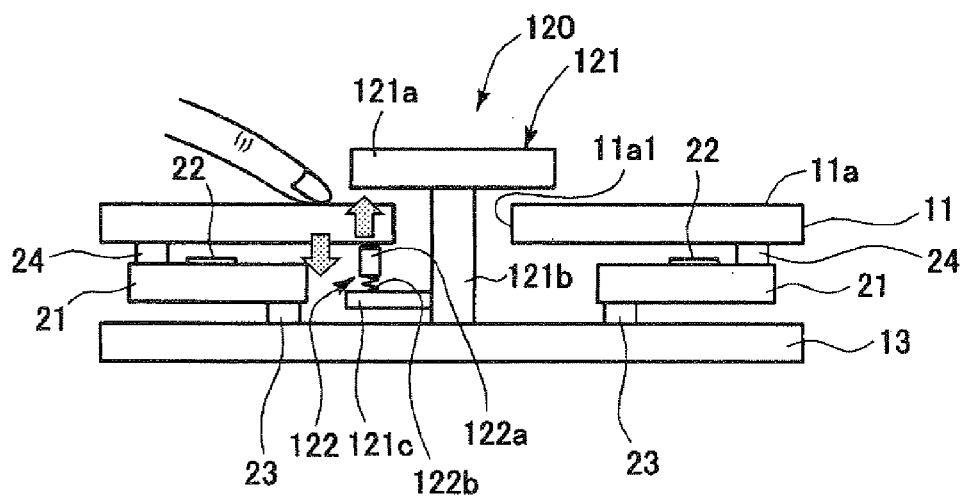
FIG. 13B is a cross-sectional view of the manipulation input apparatus of FIG. 13A.

In the above first and second embodiments, the stick 12 is provided in the manipulation input surface 11a of the panel member 11 as the structural section. Instead of such a stick 127 for example, a bias member or bias mechanism 120 may be provided as shown in FIGS. 13A, 13B. Furthermore, the other configuration is almost comparable to that of the above first embodiment.

The bias mechanism 120 is provided with a dialing portion 121 and a pressing portion 122. The pressing portion 122 is attached to the dialing portion 121 at one end while abutting to the rear surface of the panel member 11 at the other end, thereby resiliently pressing up the panel member 11 towards the manipulation input surface 11a, i.e., towards the outside of the manipulation input surface 11a.

The dialing portion 121 includes as one body unit a cylindrical dial 121a and a shaft 121b, which is extended downward from the lower surface of the dial 121a. The dialing portion 121 passes through an opening hole 11a1 formed in the manipulation input surface 11a and protrudes and exposes the upper portion thereof. The shaft 121b is supported by a frame 13 and pivotable around the axis of the shaft 121b. The support arm 121c for supporting the pressing portion 122 is attached to the peripheral portion of the shaft 121b so as to be protruding.

The pressing portion 122 is provided with a plunger 122a and a compression spring 122b. The pressing portion 122 is attached to the support arm 121c of the dialing portion 121 via the compression spring 122b. The plunger 122a is constantly pressed to the rear surface of the panel member 11 by the resilient force of the compression spring 122b. According to the rotation manipulation of the dialing portion 121, a contact position, where the plunger 122a abuts to the panel member 11, varies around the circumferential direction of the dialing portion 121.

Figure 14A:
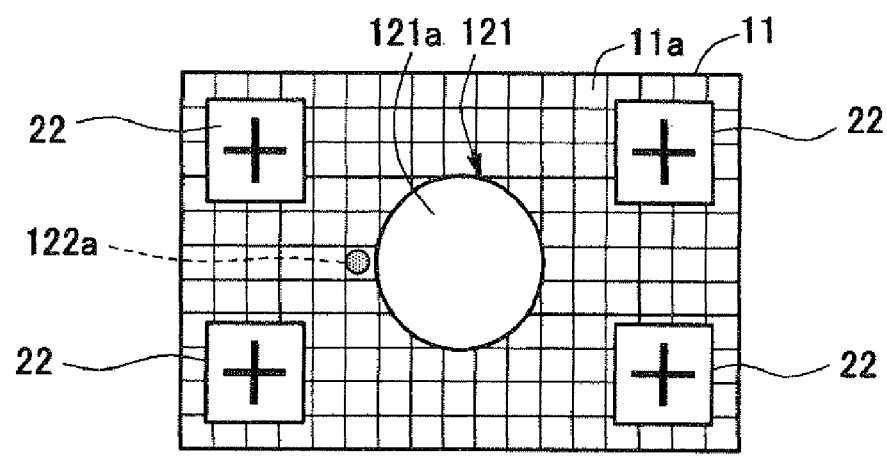
FIGS. 14A to 14B are diagrams illustrating load detection voltages extracted from strain gauges in association with the manipulation modes of the manipulation input apparatus of FIGS. 13A and 13B.
Figure 14B:
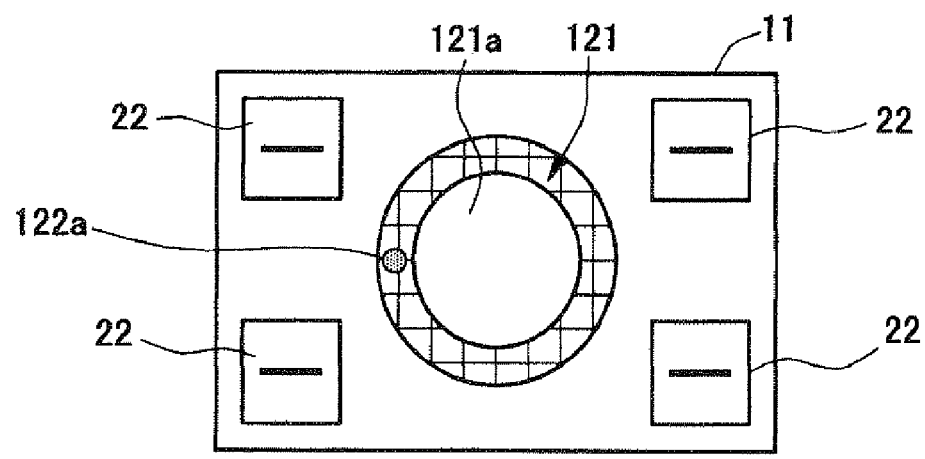

The following explains load detection voltages, which are extracted from the strain gauges 22 in association with manipulation modes using the panel member 11 or the dialing portion 121 with reference to FIGS. 14A and 14B. In the state where an operator does not perform the pressing-down manipulation to the panel member 11 the load of –Z direction, in which the panel member 11 is pressed upward or outward, is applied by the pressing portion 122 on a predetermined origin position.

When under such a state, the operator performs a rotation manipulation to the dialing portion 121, the contact position for the plunger 122a abutting to the panel member 11 changes in the circumferential direction of the dialing portion 121 in the area indicated with the cross lines in FIG. 14B. While all the load detection voltages extracted from the strain gauges 22 maintain negative (–) but change based on the contact position relative to the contact between the plunger 122a and the panel member 11. The amount of the rotation manipulation of the dialing portion 121 can be thus specified by calculating the barycentric coordinates (X, Y) from the load detection voltages extracted from each strain gauge 22.

In contrast, when the operator performs the pressing-down manipulation to the manipulation input surface 11a of the panel member 11 in the operation area indicated by the cross lines in FIG. 14A, the panel member 11 is thereby provided with the pressing-down load (load of +Z direction). The direction of the pressing-up load applied to the panel member 11 from the pressing portion 122 is reverse to the direction of the pressing-down load applied via the pressing-down manipulation to the panel member 11. The positive/negative of the load detection voltage detected by each strain gauge type sensor 22 differs between the case, when the rotation manipulation of the dialing portion 121 is carried out, and the case, when the pressing-down manipulation to the panel member 11 is carried out. Accordingly, the rotation manipulation of the dialing portion 121 and the pressing-down manipulation to the panel member 11 are clearly distinguishable. The amount of the pressing-down manipulation to the panel member 11 can be thus specified by calculating the barycentric coordinates (X, Y) based on the load detection voltages extracted from each strain gauge 22.

The dialing portion 121 can be caused to function as a dial switch for the following: changing the air blow amount and adjusting the temperature up or down in the air-conditioner 40; and switching menu contents (CD play function, radio function, MP3 play function, etc.) and adjusting a volume up or down in the audio apparatus 50, for example.

Furthermore, in the above first to third embodiments, the strain gauges 22 are used as the load detection section. Without need to be limited to the above, the following, for instance, may be also used as the load detection section. For instance, the detection section may be a piezoelectric element, an electric capacity type pressure-sensitive sensor, a detector using macromolecule resistors such as pressure-sensitive rubber and pressure-sensitive paint, or a detector using combination of an elastic member deformation and an optics and electromagnetic change.

In addition, without need to be limited to the arrangement of the strain gauges or load detection units of the load detection section at four corners of the panel member, for example, the load detection units may be arranged at each middle point of the four sides of the panel member.

Furthermore, the shape or configuration of the panel member 11 may be not only rectangular but also circular, oval, polygonal (triangle, hexagonal, etc.), for example. That is, the various shapes of the panel member can be corresponded to by changing the coordinate computation formula, etc.

Fourth Embodiment

Figure 15:
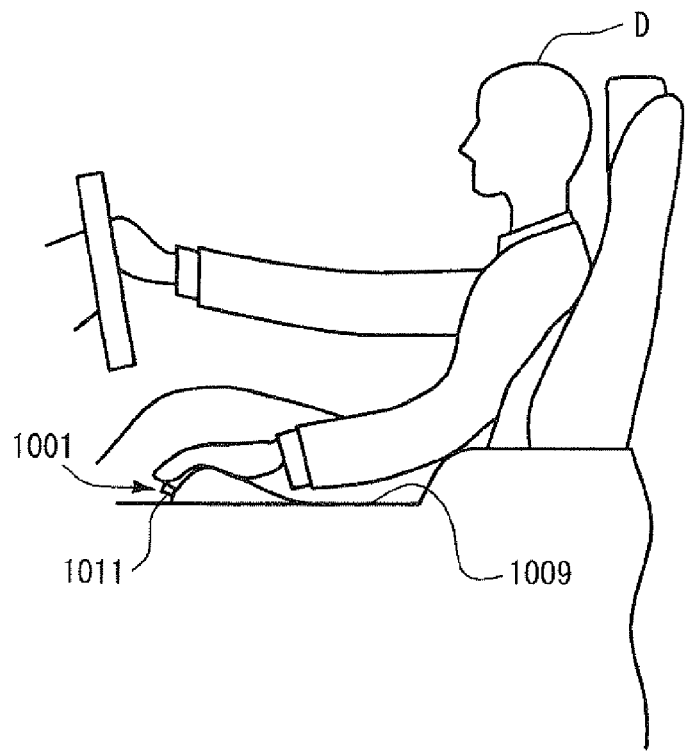
FIG. 15 is a diagram illustrating an arrangement plan of a manipulation input apparatus according to a fourth embodiment of the present invention.

Hereinafter, a fourth embodiment of the present invention is described, referring to the drawings. FIG. 15 illustrates a schematic diagram of arrangement of a manipulation input apparatus 1001 concerning the fourth embodiment.

Figure 16:
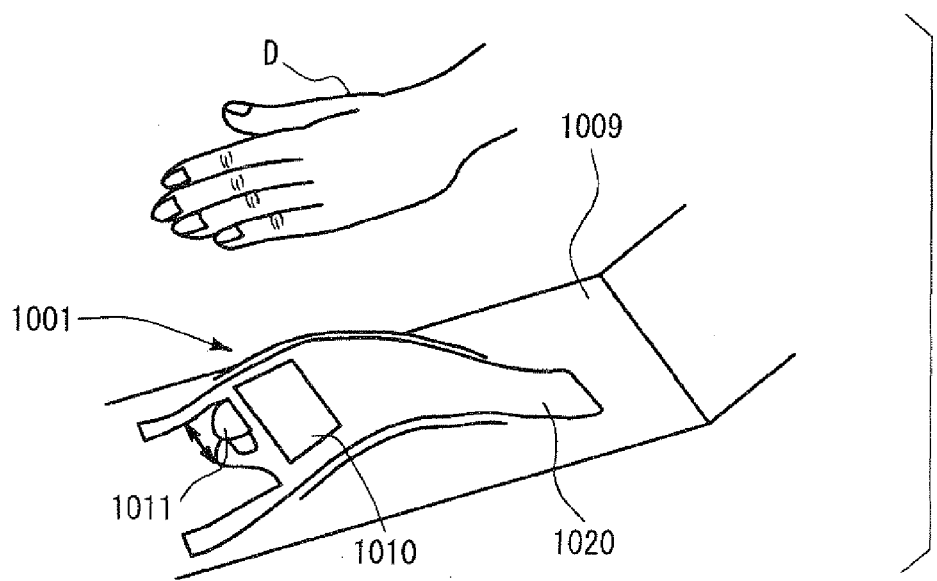
FIG. 16 is a perspective view of the manipulation input apparatus according to the fourth embodiment.

The manipulation input apparatus 1001 is applied to a remote operation apparatus provided in a compartment of a vehicle. The manipulation input apparatus 1001 is arranged at the center console 1009. The driver D can operate the manipulation input apparatus 1001 by hand as illustrated in FIG. 15. A perspective view of the manipulation input apparatus 1001 is illustrated in FIG. 16. A system configuration about control of the manipulation input apparatus 1001 is illustrated in FIG. 17.

As shown in FIG. 16, the manipulation input apparatus 1001 has a curved surface section 1020 having a three-dimensional curved surface configuration which is swelling upward in a direction approximately perpendicular such that a driver D (operator) can easily place the hand or palm on the curved surface section 1020. The driver D can place the hand along the curved surface section 1020 to thereby able to perform a manipulation input. The curved surface section 1020 may be made of material different from that of other components of the center console 1009; for example, it may be made of metal. Thus, the manipulation input apparatus 1001 has such a characteristic configuration, and the curved surface section 1020 is made of material different from that of the other components. Even if not seeing, the driver D can easily recognize that the hand is placed on the manipulation input apparatus 1001. Furthermore, who manipulates the manipulation input apparatus 1001 needs not be limited to the driver D.

The manipulation input apparatus 1001 includes, as an input section, a manipulation knob 1011 and a manipulation panel 1010. The manipulation panel 1010 is also referred to as a panel member and functions as a manipulation input surface. The operator executes various inputs by a pressing-down manipulation or a drag manipulation. The pressing-down manipulation is performed such that a finger of the operator presses down one point on the manipulation panel 1010, or moves in touch with a surface of the manipulation panel 1010. In addition the operator executes inputs also by pressing down or pulling up the manipulation knob 1011 in the two directions of the arrow shown in FIG. 16. The details of the input manipulation are mentioned later.

Figure 17:
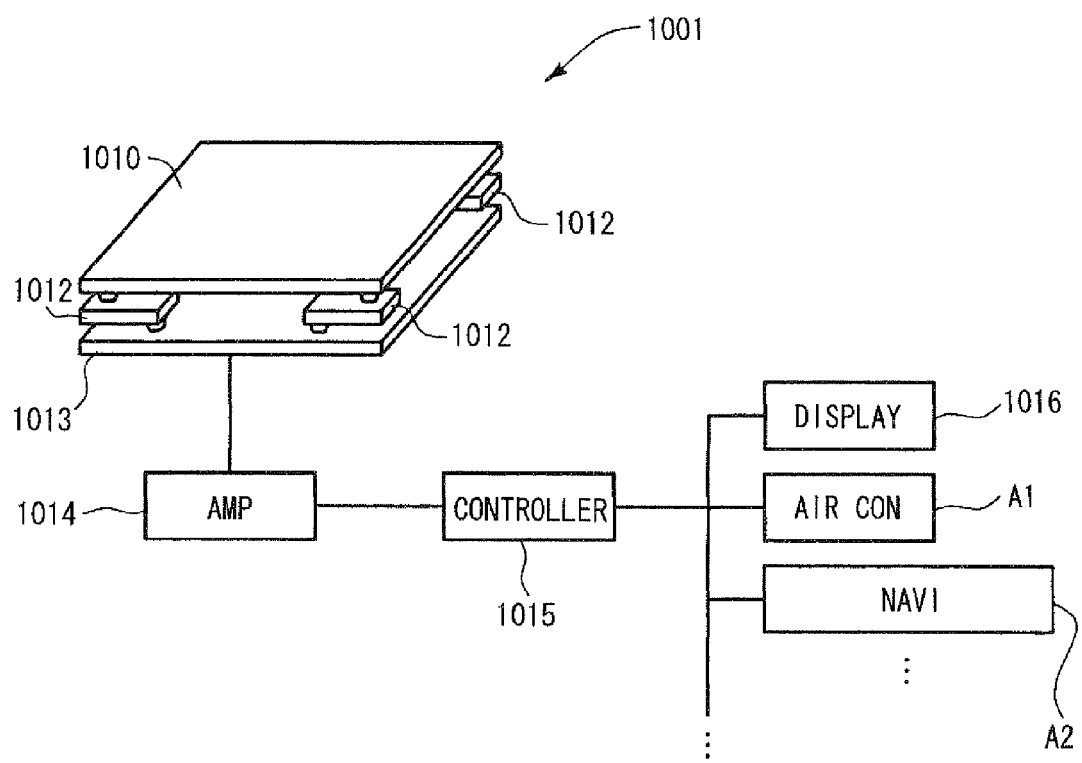
FIG. 17 is a diagram illustrating a control system according to the fourth embodiment.

As illustrated in FIG. 17, four strain gauges 1012 are arranged in between the rear surface of the manipulation panel 1010 and the frame 1013 and at the four corners of the manipulation panel 1010 respectively. In FIG. 17, the upper surface of the manipulation panel 1010 functions as a manipulation input surface while being referred to as an outside surface and front surface. In contrast, the lower surface of the manipulation panel 1010 is referred to as an inside surface and rear surface. The operator presses down the manipulation panel 1010 to thereby apply a stress or load to the manipulation panel 1010. The resistance values in the strain gauges 1012 at the four corners change depending on generated stresses. The information on change of the resistance value in each strain gauge 1012 is subjected to amplification by an amplifying circuit 1014 to thereby become the suitable range of the voltage value, which is transmitted to the controller 1015.

The controller 1015 (also called a control circuit) has a structure of a usual computer. The controller 1015 is minimally required to have a CPU for executing various processing etc., and a memory as a working area. In the controller 1015, the position which the operator depresses or presses down on the manipulation panel 1010, and the pressed force (load) is calculated from the voltage value from each strain gauge 1012. The depression position may be calculated in a formula to divide the manipulation panel 1010 interiorly in the lengthwise direction and the widthwise direction in proportion to the voltage values from the strain gauges 1012. The load can be calculated in a formula to total the voltage values from the four strain gauges 1012, for instance. When the operator performs each input by pressing down one position on the manipulation panel 1010, the controller 1015 calculates the depressed position and load using the above-mentioned method. Furthermore, the load signifies not only the load itself but also the numeric value, which is indexed to correspond to the load.

In addition, the operator may perform each input by performing a drag manipulation to trace by a finger a line or a series of (depression) positions on the manipulation panel 1010. In this case, the controller 1015 calculates the direction of the drag manipulation by connecting the depressed positions at respective clock times from the start to the end of the drag manipulation. In addition, the load in the drag manipulation is calculated from loads at clock times from the start to the end of the drag manipulation.

The vehicle is equipped with an air-conditioner A1 and a navigation apparatus A2, two of which are operation targets of the manipulation input apparatus 1001. The display section 1016 is commonly used as the display section for both the air-conditioner A1 and the navigation apparatus A2; thus, the display section 1016 displays various operation buttons of both the air-conditioner A1 and the navigation apparatus A2. The display section 1016 may be a liquid crystal display etc., which is arranged in the instrument panel of the vehicle.

Figure 19A:
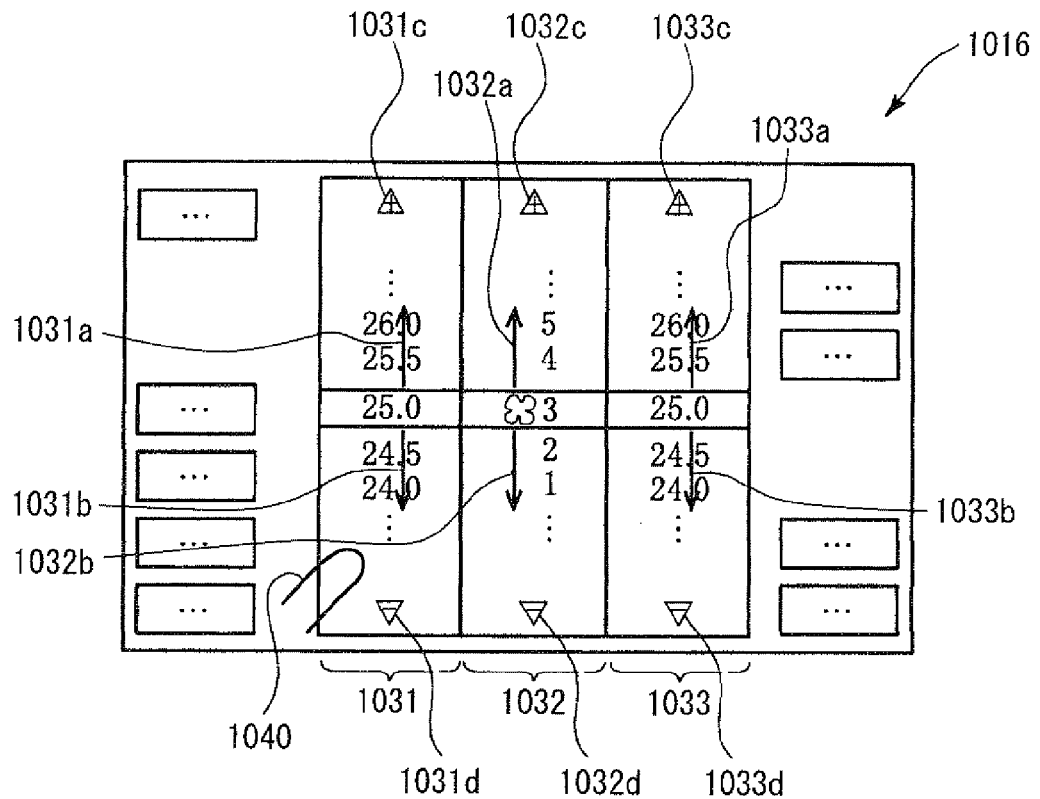
FIGS. 19A to 19B are examples of display windows according to the fourth embodiment.
Figure 19B:
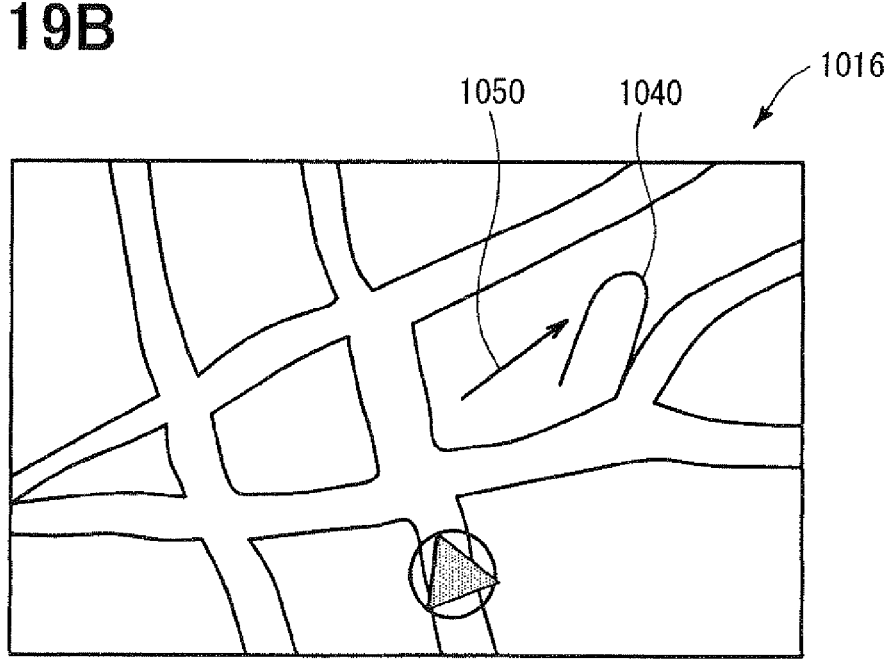

FIGS. 19A and 19B illustrate display examples of the display section 1016. FIG. 19A shows an example of the operation display window of the air-conditioner A1; FIG. 19B shows an example of the operation display window of the navigation apparatus A2. Thus, the display windows are switched to each other according to the operation target. In FIG. 19A, while the various manual operation buttons are displayed in the periphery, several setting areas are displayed in a central area of the display window. The several setting areas include a desired temperature setting area 1031 for the front passenger side, an air blow amount setting area 1032, and a desired temperature setting area 1033 for the driver side. In addition, FIG. 19B illustrates a map and a present position of the subject vehicle superimposed on the map.

It is assumed that each position on the display section 1016 corresponds one-to-one to each position on the manipulation panel 1010. The controller 1015 supposes that when an operator presses down a position on the manipulation panel 1010, an input to the corresponding position on the display section 1016 is performed. Hereinafter, in such a meaning, the explanation is made as if the operator performs a depression manipulation or drag manipulation on the display section 1016 although the operator actually performs the depression manipulation or drag manipulation on the manipulation panel 1010.

In FIG. 19A, when the operator performs a drag manipulation on the area 1031 like Arrow 1031a, the front passenger side desired temperature (setting temperature) increases. Further, when the operator performs a drag manipulation on the area 1031 like Arrow 1031b, the front passenger side desired temperature (setting temperature) decreases. When the operator performs a drag manipulation on the area 1032 like Arrow 1032a, the desired air blow amount (setting air blow amount) increases.

Further, when the operator performs a drag manipulation on the area 1032 like Arrow 1032b, the desired air blow amount (setting air blow amount) decreases. When the operator performs a drag manipulation on the area 1033 like Arrow 1033a, the driver side desired temperature (setting temperature) increases. Further, when the operator performs a drag manipulation on the area 1033 like Arrow 1033b, the driver side desired temperature (setting temperature) decreases.

In addition, in FIG. 19A, the operation buttons 1031c, 1032c, 1033c, 1031d, 1032d, and 1033d are displayed on the areas 1031, 1031, and 1033. When the operation buttons 1031c, 1032c, and 1033c are pressed down, the front passenger side setting temperature, the air blow amount, and the driver side setting temperature increases, respectively. When the operation buttons 1031d, 1032d, and 1033d are pressed down, the front passenger side setting temperature, the air blow amount, and the driver side setting temperature decreases, respectively.

In FIG. 19B, when a drag manipulation is performed like Arrow 1050, the map scrolls in such drag direction. Of course, the direction of the Arrow 1050 of FIG. 19B is only an example, and can be dragged in any arbitrary direction. Furthermore, an outline 1040 (finger image) of the operator's finger can be displayed on the display section 1016 as illustrated in FIGS. 19A and 19B. Such a finger image 1040 may be displayed at the position, which corresponds to the position on the manipulation panel 1010 which is calculated by the controller 1015 based on the depressed position using the above-mentioned method. Thereby, the operator can confirm the position of his/her finger, reducing the possibility of the operation mistake.

Generally various input information is divided into quantitative input information and not quantitative input information. For example, with respect to the air-conditioner A1, an input of whether the air-conditioner A1 is turned into an ON state or OFF state is a not quantitative input. In contrast, an input of which temperature the desired temperature is set to is a quantitative input. Further, an input of which amount the air blow amount is set to is also a quantitative input. In addition, with respect to the navigation apparatus A2, a manipulation input to scroll a map is related with how far scrolling is carried out; thus, it is a quantitative input.

In present embodiment, such a quantitative input is performed by a magnitude of the load in the depression manipulation of the operator to the manipulation panel 1010. That is, the controller 1015 determines that as the operator performs a depression stronger to the manipulation panel 1010, a greater input quantity is inputted, and that as the operator performs a depression weaker to the manipulation panel 1010, a less input quantity is inputted. Therefore, the controller 1015 functions as an example of an input determination means or a section to determine a quantity of a load to the manipulation panel 1010. Thus, in case that a greater input quantity needs to be inputted, the required input period for the greater input quantity may be comparable with the required input period for a less input quantity in a conventional technology. This helps prevent the interference to the safety in driving operation.

The following is specific explanation with reference to FIG. 19A. In case that the operator performs a drag manipulation in the direction of Arrows 1031a, 1032a, and 1033a, as the load of the drag manipulation increases, the front passenger side setting temperature, the desired air blow quantity, or the driver side setting temperature increases the quantity of increasing the temperature. Further, in case that the operator performs a drag manipulation in the direction of Arrows 1031b, 1032b, and 1033b, as the load of the drag manipulation increases, the front passenger side setting temperature, the desired air blow quantity, or the driver side setting temperature increases the quantity of decreasing the temperature.

In case that the operator performs a depression manipulation to the operation buttons 1031c, 1032c, and 1033c, as the load of the depression manipulation increases, the front passenger side setting temperature, the desired air blow quantity, or the driver side setting temperature increases the quantity of increasing the temperature. In case that the operator performs a depression manipulation to the operation buttons 1031d, 1032d, and 1033d, as the load of the depression manipulation increases, the front passenger side setting temperature, the desired air blow quantity, or the driver side setting temperature increases the quantity of decreasing the temperature. In addition, in FIG. 19B, the scroll quantity of the map to the direction of the drag manipulation is increased when the quantity of the load in the drag manipulation is increased.

Furthermore, in the present embodiment, that the increasing quantity, decreasing quantity, or scrolling quantity is increased as the load increases does not necessarily correspond to a monotonically increasing function. It can be extended to correspond to a monotonically nondecreasing function. Such an example is illustrated in FIG. 18.

Figure 18:
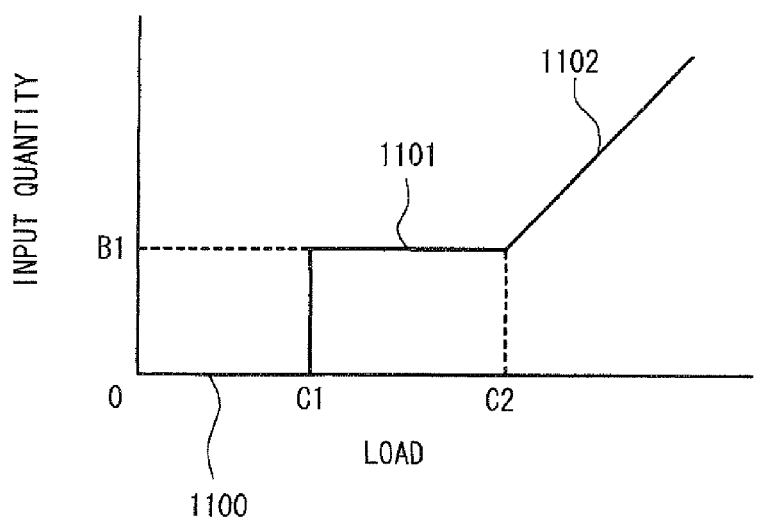
FIG. 18 is a graph illustrating an example of a relationship between an input quantity and a load according to the fourth embodiment.

FIG. 18 illustrates how to determine an input quantity according to a load. The load of the axis of abscissa is an amount of the load which the operator applies when pressing down the manipulation panel 1010. The input quantity of the axis of ordinates is an increasing quantity and decreasing quantity in the above-mentioned front passenger side setting temperature, desired air blow quantity, driver side setting temperature, and the scrolling quantity in the map. It is clearly observed that the input quantity corresponds to a monotonically nondecreasing function of the load.

In the example of FIG. 18, when the load is smaller than C1, the input quantity is regarded as zero (straight line 1100). Therefore, when the operator touches faintly without the intention of manipulation, such touch is not treated as an input, thereby helping prevent mis-manipulation. In addition, when the load is in the range between C1 and C2 (straight line 1101), such a load is treated as an input quantity of a constant value B1. When the load exceeds C2, the load is treated as an input quantity to increase in monotone according to the quantity of the load. In particular, in FIG. 18, when the load exceeds C2, the load is treated as an input quantity to follow a linear function (straight line 1102).

The straight line 1101 corresponds to a conventional control which does not change an input quantity according to the magnitude of the applied load. The straight line 1102 corresponds to a featured control of the present embodiment which determines that an input quantity is greater as (the magnitude of) the applied load is greater. Thereby, while the input quantity does not sharply respond to the applied load until the applied load reaches the load C2, the input quantity sensitively responds to the applied load when the applied load exceeds the load C2. Such a featured configuration can provide a manipulation input apparatus with favorable operability. In particular, when the load is equal to or less than the load C2, the applied load is regarded as an input for switching an ON state and an OFF state at the bordering point of the load C1. This configuration does not inquire a delicate input feeling in the region where the input quantity is small. The setting values of B1, C1, C2 may be predetermined properly. The characteristic shown in FIG. 18 may be stored in the controller 1015, and used always when the operator performs a manipulation input.

Furthermore, with respect to the drag manipulation in the areas 1031, 1032, and 1033 in FIG. 19A, the direction of the drag manipulation by the operator may be an oblique direction instead of an up-down direction in FIG. 19A. In such a case, the controller 1015 may determine that the drag direction is either the upward direction or the downward direction by referencing the horizontal direction in FIG. 19A.

The manipulation knob 1011 is used for the various inputs by the operator's pressing down or pulling up. For example, the manipulation knob 1011 is used for the operation input to the navigation apparatus A2 as follows. In the display window shown in FIG. 19B, when the operator presses down or pushes the manipulation knob 1011, the map is reduced; when pulling up, the map is enlarged. The controller 1015 controls such that the degree of the reduction of the map follows the degree of pressing down the manipulation knob 1011 and the degree of the enlargement of the map follows the degree of pulling up the manipulation knob 1011.

The manipulation input apparatus of the present embodiment may not be limited to the above explanation. As long as the configuration is provided such that a quantitative input is entered according to the quantity or magnitude of the load applied to the manipulation input surface by the operator, the present embodiment can be applied to various apparatuses without need to be limited to in-vehicle apparatuses. Further, for example, it can be applied to an in-vehicle audio apparatus or a video (DVD) apparatus. In such cases, the present featured configuration can be used for setting an audio volume or changing a replay position, which is currently reproduced.

In the above embodiment, the manipulation panel 1010 includes the manipulation input surface. The strain gauges 1012 constitute the detection section. The controller 1015 includes an input determination section. The straight line 1102 and the controller 1015 constitute a first determination section. The straight line 1101 and the controller 1015 constitute a second determination section. Furthermore, the manipulation input apparatus 1001 may be applied to any apparatus other than the in-vehicle apparatus.

(Effect)

The present embodiment has an advantage or effect to be able to respond to the following problem or the like of a conventional technology. That is, as a navigation apparatus recently spreads in vehicles, the navigation apparatus is installed in the vehicle in combination with an air-conditioner, an audio apparatus, a video apparatus, or the like. Further, there is a tendency that functions of each apparatus develop, thereby complicating operating methods. Therefore, it is desired that each apparatus has an input method or apparatus which is easier and highly safer.

For example, there is disclosed a method of scrolling of the map in a navigation apparatus. The scrolling method is changed by whether the vehicle is in the stop state or the run state to intend to achieve at the same time (i) an operability of the map scroll in the stop state and (ii) a safety in the map scrolling in the run state.

Relative to the safety in operating an in-vehicle navigation apparatus, scrolling of a long distance on the displayed map typically requires a long operation time of a scrolling operation or scrolling manipulation. Such a long-time scrolling operation may pose a problem or risk to decrease the driver's attention to the driving operation. The above-mentioned technology asserts that the scrolling operation becomes simple in the run state; however, it requires several times of operations for scrolling a long distance on the map, thus not thoroughly solving the problem.

The same problem may arise in the scrolling operation other than the map scrolling manipulation in the navigation apparatus. Examples include the change of the desired temperature and the change of the air blow quantity in the air-conditioner. In such a case that an input quantity is large with respect to the input of the quantitative information, the same problem may arise like in the case that the travel distance is large in the map scrolling. That is, performing an input having a large input quantity requires a complicated manipulation or a long time manipulation. While executing such a manipulation, there is a risk to decrease the driver's attention to the driving operation.

In contrast, the present embodiment can provide a technology to avoid a complicated and long-time input manipulation even in entering a quantitative input having a large input quantity.

Fifth Embodiment

Figure 20:
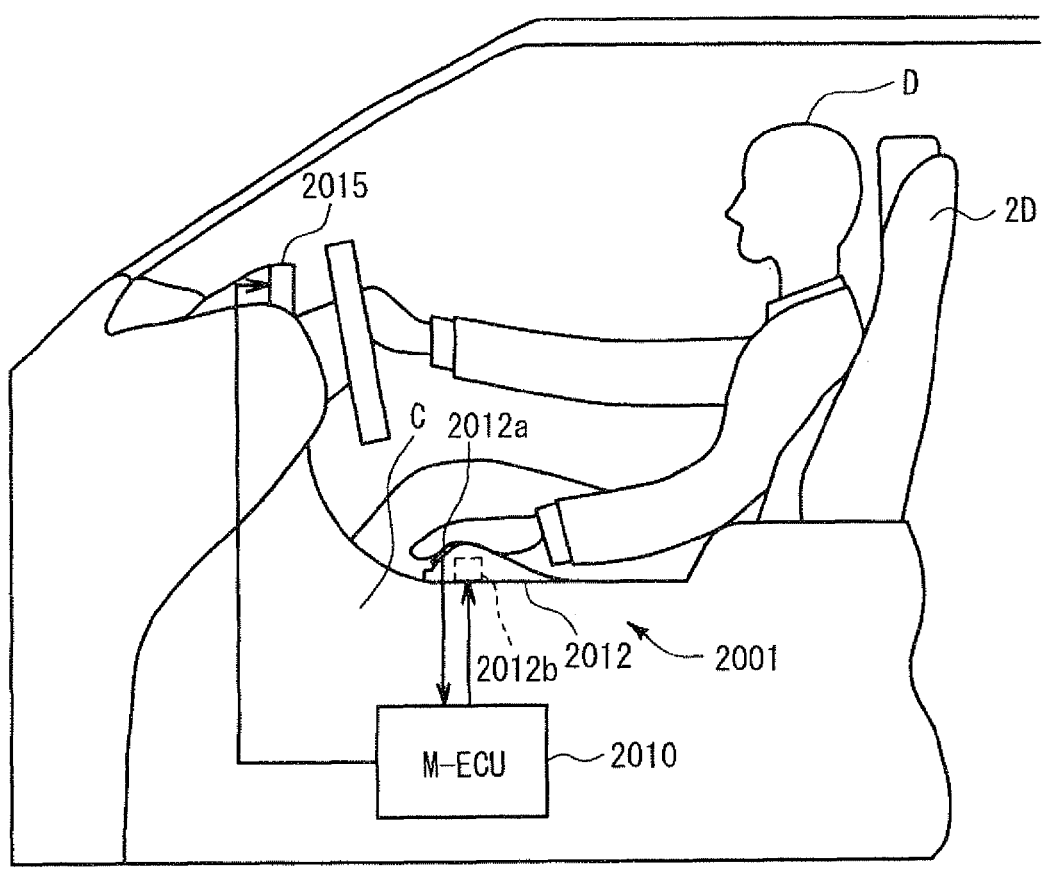
FIG. 20 is a schematic diagram illustrating an example of an arrangement plan of an in-vehicle manipulation input apparatus according to a fifth embodiment.

Hereinafter, a fifth embodiment is explained while referring to the drawings. FIG. 20 illustrates an example of an arrangement of an in-vehicle manipulation input apparatus in the compartment of a subject vehicle according to the present embodiment. That is, a monitor 2015 as a display section is arranged in a central portion of the instrument panel in the vehicle compartment. A manipulation section 2012 (also referred to as an input section) is arranged in, of the center console C, a position which can be manipulated from a driver seat 2D and a passenger seat (not illustrated). Although the purpose of use is not specifically limited, for example, the manipulation input apparatus is for performing functional operation of a car navigation apparatus or a car audio apparatus while looking at the display window of the monitor 2015 provided in the center console.

Figure 21:
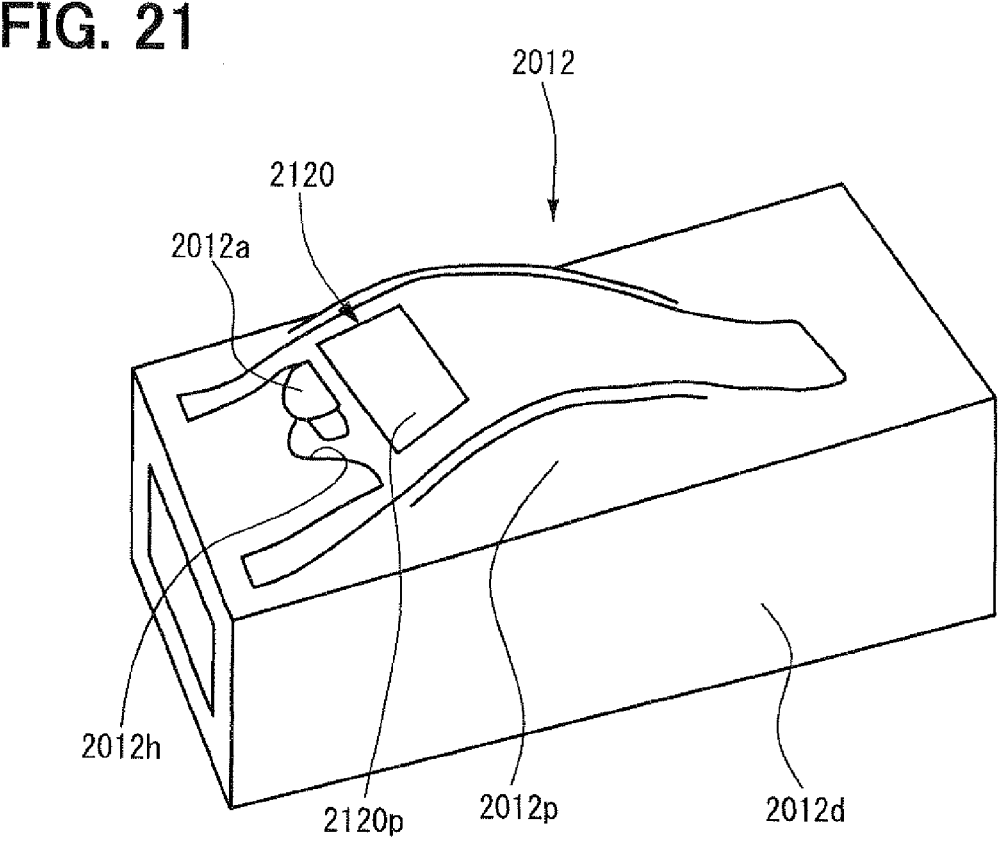
FIG. 21 is a perspective view illustrating an example of an external appearance of an input section of the manipulation input apparatus according to the fifth embodiment.

FIG. 21 illustrates an example of an outside view of the manipulation section 2012 (also referred to as an input section 2012). A casing 2012d is configured to have in its upper surface a palm rest portion 2012p, which is swelled upward in a convex form in FIG. 21 to enable a user or operator to put or rest his/her palm. A touch manipulation input surface (also referred to as a manipulation input surface) 2120p of a manipulation member 2120 is exposed while a manipulation knob 2012a protrudes upward through a penetration window 2012h, which is arranged in the front side of the manipulation section 2012.

Figure 22:
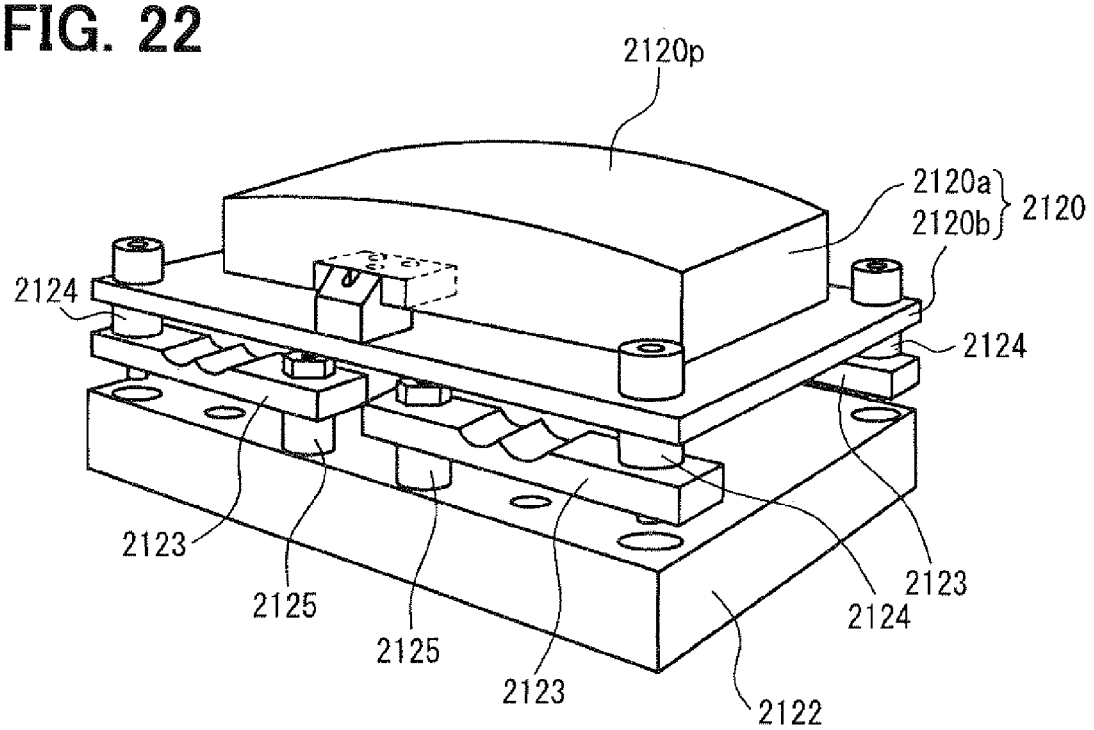
FIG. 22 is a perspective view illustrating an inside configuration of the input section of the manipulation input apparatus according to the fifth embodiment.

FIG. 22 illustrates an inside portion accommodated in the casing 2012d. User's touch manipulation load is applied to the touch manipulation input surface 2120p of the manipulation member 2120; a manipulation support section 2122 is configured to support the manipulation member 2120 by receiving the load applied to the manipulation member 2120. In addition, four different load transmission routes configured by elastic linkage support members 2123 are formed from the manipulation member 2120 to the manipulation support section 2122. In the load transmission routes, several load detection units (i.e., strain gauge units) are arranged respectively to detect loads transmitted to the manipulation support section 2122 via the manipulation member 2120.

The manipulation member 2120 is also referred to as a flattened input member or a panel member, which provides the touch manipulation input surface 2120$p$ in one side (front side) of the thickness direction. In detail, the manipulation member 2120 includes a plate-shaped body 2120$b$ and an input pad 2120$a$. The input pad 2120$a$ is integrated to the upper front surface of the plate-shaped body 2120$b$ while having the flattened manipulation input surface 2120$p$ in the outside surface or the front surface which is opposite to the surface facing the plate-shaped body 2120$b$.

As explained above, the elastic linkage support members 2123 constituting the load transmission routes are provided between the manipulation member 2120 and the manipulation support section 2122. The elastic linkage support member 2123 is subjected to an elastic deformation to resist the deformation of the manipulation member 2120 due to the touch manipulation input. The several elastic linkage support members 2123 are respectively arranged along the peripheral portion of the manipulation member 2120. The elastic linkage support member 2123 is connected with the manipulation support section 2122 at the one end and the peripheral portion of the manipulation member 2120 at the other end. The elastic linkage support member 2123 is formed as an elastic beam member to be subjected to the flexure deformation in the pressing down direction (i.e., inward direction) of the manipulation input surface 2120$p$.

Figure 23:
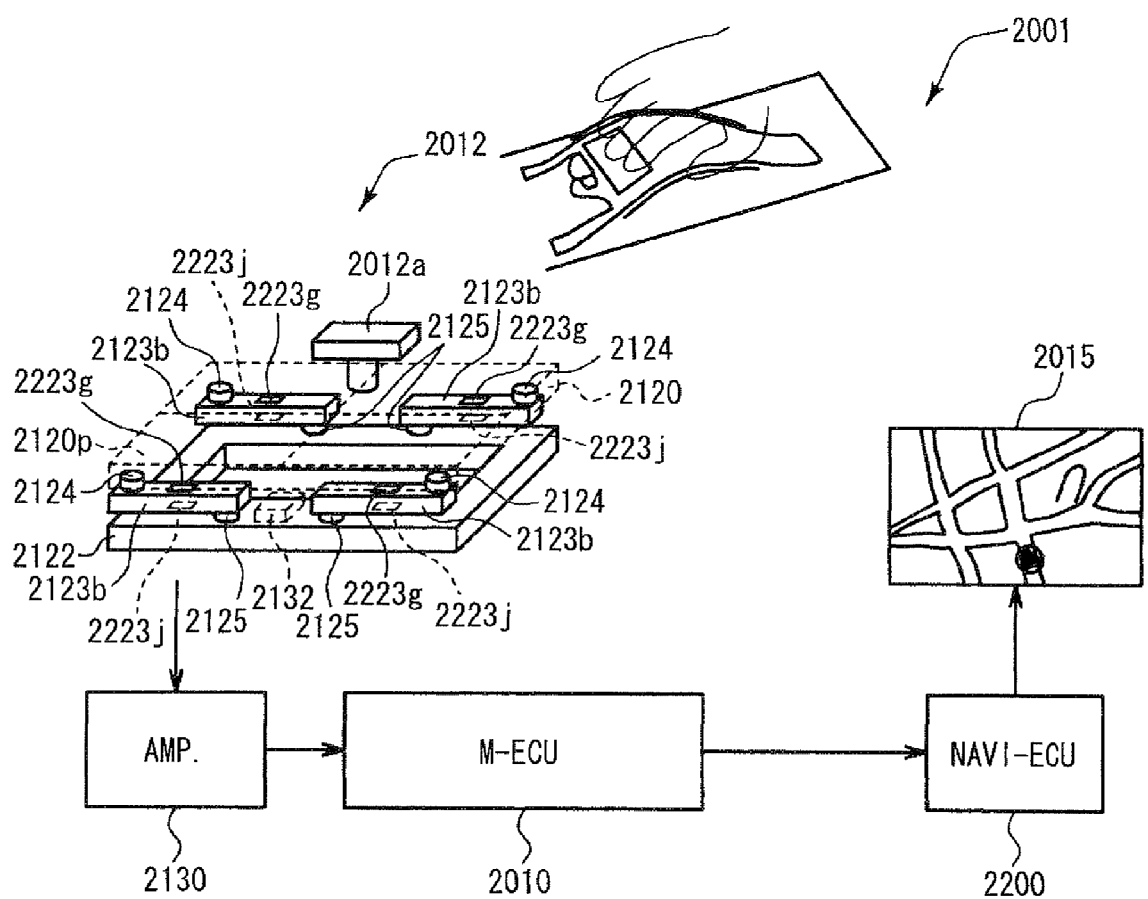
FIG. 23 is a block diagram illustrating an example of an overall configuration of the in-vehicle manipulation input apparatus for in-vehicle electronic apparatuses according to the fifth embodiment.

FIG. 23 is a block diagram illustrating an overall configuration of the manipulation input apparatus 2001 containing the input section 2012. In FIG. 23, the input section 2012 is illustrated in a manner simpler than that in FIG. 22. For instance, the one-side warped manipulation member 2120 is illustrated as a flat plate-shaped member. The load detection section is provided in the above elastic beam member 2123 (elastic linkage support member 2123). In detail, the load detection section includes strain gauges 2223$g$, which are attached to the side forming convex portions (upper side in FIG. 23) when the pressing-down manipulation is applied to the touch manipulation input surface 2120$p$. In addition, the manipulation support section 2122 is a base substance shaped of a block to be arranged with a predetermined interval with the rear surface (i.e., lower surface) of the manipulation member 2120.

As illustrated in FIG. 22, the manipulation member 2120 has a rectangular flat rear surface. Each elastic beam member 2123 is arranged along a peripheral portion of the rear surface of the manipulation member 2120. The elastic beam member 2123 is accommodated within the rear side of the manipulation member 2120 to thereby contribute to saving the space.

A first longitudinal end of the elastic beam member 2123 is coupled to the manipulation member 2120 with a predetermined interval using an intervening first linkage spacer 2124. A second longitudinal end of the elastic beam member 2123 is coupled to the manipulation support section 2122 with a predetermined interval using a second linkage spacer 2125. In the present embodiment, the manipulation member 2120 has a rectangular surface. The first end of each elastic beam member 2123 is coupled to the corner of the rectangular rear surface of the manipulation member 2120 via the first linkage spacer 2124. In one long side of the rectangular rear surface of the manipulation member 2120, two elastic beam members 2123 adjoin each other in their longitudinal direction in a row, while their second ends face closely each other. Further, these second ends are coupled to the manipulation support section 2122 via the second linkage spacers 2125, respectively. Thus, the long sides of the rectangular rear surface of the manipulation member 2120 are used so as to able to secure a comparatively long longitudinal length of each elastic beam member 2123. Even if the pressing-down load applied to the manipulation member 2120 is comparatively small, the flexure deformation of the elastic beam member 2123 can be significantly enlarged. Such a configuration can contribute to the improvement in the detection accuracy of the load level.

In addition, as illustrated in FIG. 20, a manipulation knob 2012$a$ is provided in the upper surface (i.e., outside surface or front surface) of the manipulation member 2120 (i.e., the input pad 2120$a$ of FIG. 21) and in a position extended from the manipulation input surface 2120$p$. The manipulation knob 2012$a$ is used for carrying out manipulation displacement of the manipulation member 2120 in a direction equal to a direction of pressing down manipulation to the touch manipulation input surface 2120$p$. The manipulation knob 2012$a$ is also used for the pulling-up manipulation in the direction reverse to the pressing-down manipulation by applying the reverse flexure deformation to the elastic beam members 2123.

Thus, the manipulation load can be applied to the touch manipulation input surface 2120$p$ or the manipulation knob 2012$a$. Thereby, according to the manipulation position and the manipulation load level, the manipulation member 2120 is displaced and the elastic beam members 2123 undergo the flexure deformation, respectively. The strain gauges 2223$g$ in the elastic beam members 2123 follow the flexure deformation of the elastic beam members 2123 to thereby receive in-plane strains and vary electric resistance values, respectively. Each strain gauge 2223$g$ is included in a suitable resistance detection circuit to thereby configure a strain gauge unit. The resistance detection circuit may be a known circuit, for example, the Wheatstone bridge, the more simpler half bridge, etc., the explanation of which is omitted because of such technology being known. When a detection voltage is applied to the detection circuit, the resistance change of the strain gauge 2223$g$ and, further, the load level applied to the elastic beam member 2123 can be extracted in the form of the load detection voltage.

The load detection voltage from each strain gauge unit is amplified with an amplifier 2130 and is inputted into the manipulation ECU 2010 as load level information. The manipulation ECU 2010 performs a calculation to prepare input information based on the load detection voltages. The input information includes an input position on the input coordinates corresponding to the touch manipulation input surface 2120$p$, a direction of drag manipulation on the touch manipulation input surface 2120$p$ in response to the time-basis change, and a pressing-down force or load specified from the absolute value of the load detection voltage. The result of the calculation is transmitted to a navigation ECU 2200 which primarily controls a navigation apparatus, for example.

Figure 24:
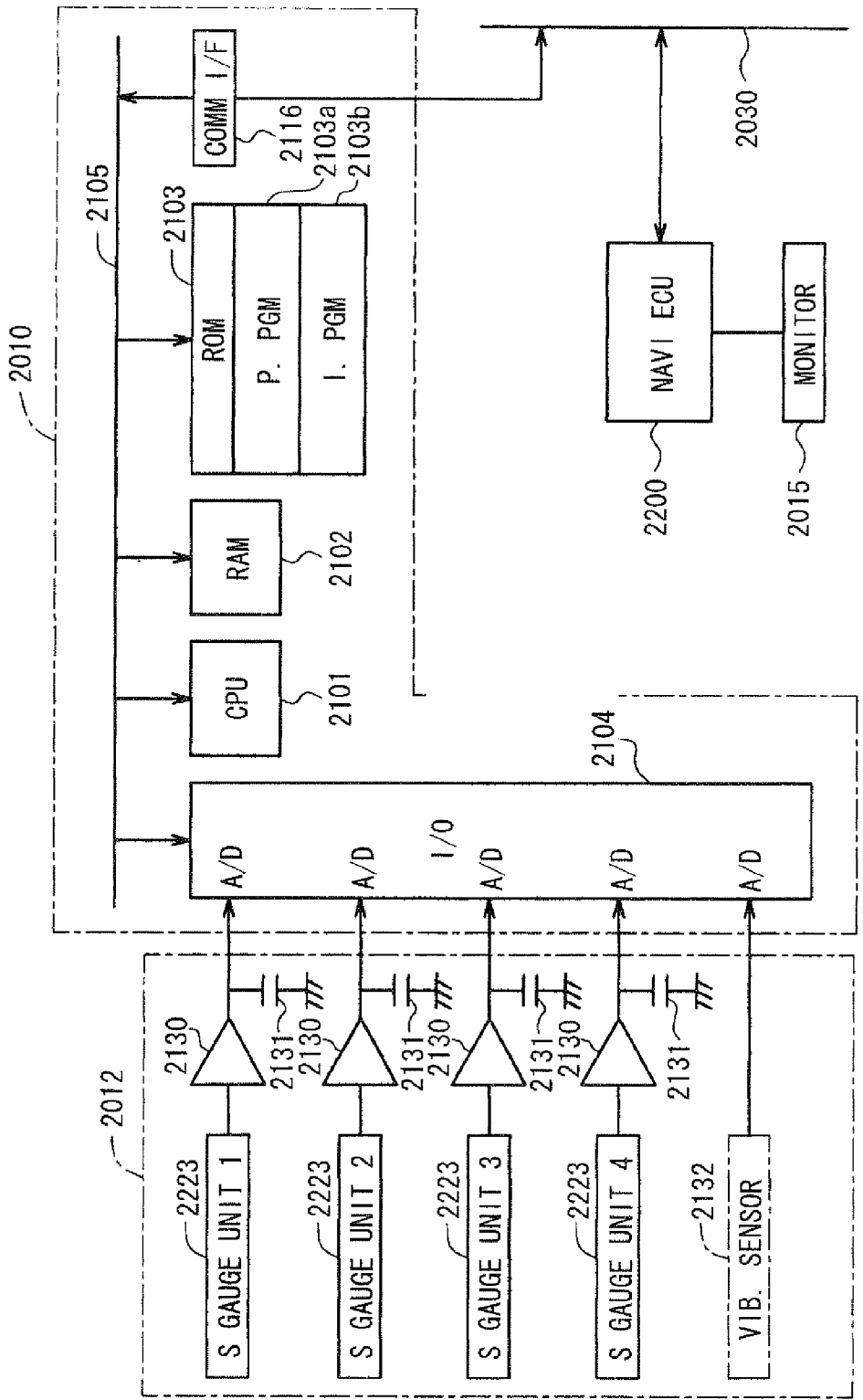
FIG. 24 is a block diagram illustrating a manipulation ECU and peripherals according to the fifth embodiment.

FIG. 24 is a block diagram illustrating in more detail an electrical configuration of the manipulation ECU 2010 (also referred to as a controller). The manipulation ECU 2010 is configured as a computer hardware circuit board having a CPU 2101, a RAM 2102, a ROM 2103, an input and output section 2104, a serial communication interface 2116, and an internal bus 2105, connecting the foregoing components. The input and output section 2104 has A/D conversion input ports, which are connected with the strain gauge units 2223 containing strain gauges 2223$g$ and auxiliary strain gauges 2223$j$ shown in FIG. 23 via amplifiers 2130, respectively. Furthermore, bypass capacitors 2131 are inserted between output paths of the amplifiers 2130 and the ground to thereby eliminate vibrational noise components with comparatively high frequencies, such as engine vibration.

Furthermore, in the present embodiment, the four strain gauge units 2223 are used commonly as a vibration detection section to detect vibration with a large amplitude continuing in comparatively long duration. Such vibration arises continuously in vehicle's traveling on bad roads. Especially, the vibration with the high level continues for a considerable long period during traveling on unpaved roads. Suppose the case that predetermined one(s) of the strain gauge units 2223 detects the load level exceeding a threshold value continuously for equal to or greater than a fixed time (e.g., five seconds). Such load level corresponds to low frequency vibration components unremovable in the bypass capacitors 2131. In such cases, it is determined that the vibration arises which should be taken into consideration on the calculation of the input information. The vibration arising in the vehicle applies translational vibration load to all the input section 2012, and, eventually, the several strain gauge units 2223 as the load detection section. When all the strain gauge units 2223 detect the load level which exceeds the threshold value, it may be determined that the vibration arises.

In addition, the serial communication interface 2116 is connected to an in-vehicle serial communication bus 2030 such as CAN (Controller Area Network) communication bus. Thus, the manipulation ECU 2010 can communicate with other ECUs including the navigation ECU 2200 connected with the in-vehicle serial communication bus 2030.

In addition, the ROM 2103 stores the following software programs for the CPU 2101 to execute. Thereby, the CPU 2101 may function as an input information determination means or section, a calculation means or section to calculate a touch input position coordinates, an output control means or section, and a load level comparison means or section.

Position calculation program 2103*a*: Based on the load level which each strain gauge unit 2223 (load detection section) detects, the touch input position coordinates on the touch manipulation input surface 2120*p* are calculated as input information. In addition, when the pressing-down manipulation to the manipulation knob 2012*a* is applied, input position coordinates are calculated on the same coordinate plane as that of the touch input position coordinates, with respect to the pressing-down manipulation to the area corresponding to the manipulation knob 2012*a*. Based on the calculated input position coordinates, the pressing-down manipulation to the manipulation knob 2012*a* is identified as manipulation input information. The identified manipulation input information is outputted to be differentiated from the touch input position coordinate information obtained when the touch manipulation to the touch manipulation input surface 2120*p*. In addition, based on the load levels detected by the auxiliary strain gauges 2223*j*, input information relative to the pulling-up manipulation to the manipulation knob 2012*a* is prepared and outputted. In any above processing, the load level inputted from each strain gauge unit 2223 is compared with a predetermined reference value (hereinafter referred to as an input detection determination reference value). If the load level exceeds the predetermined reference value in any strain gauge unit 2223, calculation of the input position coordinates is executed. To the contrary, if the load level is less than the reference value in all the strain gauge units 2223, the calculation of the input position coordinates is not executed. Alternatively, even if the calculation is executed, the calculated result is not outputted to the navigation ECU 2200.

Input control program 2103*b*: According to the detected vibration level, the generation processing of the input information such as touch input position coordinates is amended. In addition, the control is executed to restrict the output of the input information. More specifically, when the state where the detected vibration detection level exceeds a predetermined threshold value continues equal to or greater than a fixed period, the above-mentioned control of amendment or restriction is executed. For instance, such amendment or restriction is executed as follows. When the vibration detection level exceeds a first threshold value, the reference value used as the comparison target of the detection load level is amended to be increased than usual. When the vibration detection level exceeds a second threshold value higher than the first threshold value, the output or calculation itself of the input information such as touch input position coordinates is prohibited.

Figure 25:
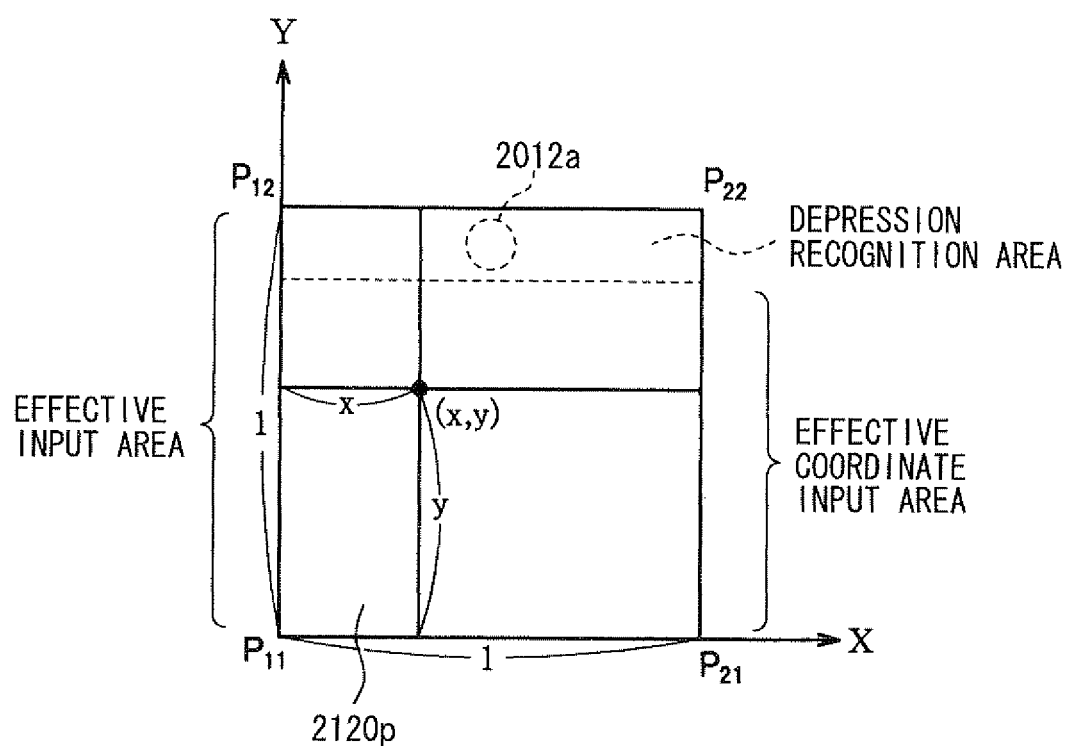
FIG. 25 is a diagram explaining a concept to calculate input position coordinates based on detected load levels from each strain gauge unit according to the fifth embodiment.

The following explains an operation of the in-vehicle manipulation input apparatus 2001. First, the preparation process of input information by the position calculation program 2103*a* when a manipulation load is applied to the touch manipulation input surface 2120*p* or the manipulation knob 2012*a* in FIG. 22 and FIG. 23. As illustrated in FIG. 25, the heading direction of the vehicle is defined as Y direction while the width direction of the vehicle is defined as X direction. An input coordinate plane is defined as covering the touch manipulation input surface 2120*p* and the manipulation knob 2012*a*. An effective input area is defined as an area where a manipulation load is applied. Furthermore, in order to understand easily, the effective input area is specified as a square area having four sides, each of which has one unit length (1). Thereby, the input coordinate values x, y are calculated and specified as a numerical value within a range $0<=x<=1$ and $0<=y<=1$, respectively.

The flexural rigidity of the manipulation member 2120 is extremely greater than that of each elastic beam member 2123. The manipulation member 2120 can be mostly dealt with as a rigid body. The displacement of the manipulation member 2120 can be absorbed by the elastic flexural displacement of each elastic beam member 2123. It is assumed that flexure deformation of the manipulation member 2120 itself is not generated in the present case. The coordinate position, where a load is applied, corresponds to an input position coordinates (x, y), which should be recognized. The input position coordinates is regarded as an intersecting point of the X direction and Y direction. The load applied to the input position coordinates is distributed to the X and Y direction according to the leverage relation. The coupling end of each elastic beam member 2123 to the manipulation support section 2122 is a fixed end. The distributed load to each coupling point with the manipulation member 2120 is regarded as a flexure load. The coupling point corresponds to the corner position of the rectangular manipulation member 2120, i.e., the vertex position of the effective input area in FIG. 25. Each of the four elastic beam members 2123 is subjected independently to the flexure deformation.

The four distributed loads corresponds to load levels which the strain gauge units 2223 of the elastic beam members 2123 detect, respectively. As shown in FIG. 25, P11, P12, P21, and P22 are defined. The load distribution ratios in Y direction are P11:P12 and P21:P22, both of which are equal to each other The load distribution ratios in X direction are P11:P21 and P12:P22, both of which are equal to each other. Therefore, Py1=P11+P21, Py2=P12+P22, Px1=P11+P12, and Px2=P21+P22. As illustrated in FIG. 25, according to the leverage relation, with respect to Y direction, $$Py2/Py1=y/(1-y) \quad (1)$$

If solved for y, $$y=Py2/(Py1+Py2)=(P12+P22)/(P11+P12+P21+P22) \quad (2)$$

With respect to X direction, $$Px2/Px1=x/(1-x) \quad (3)$$

If solved for x, $$x=Px2/(Px1+Px2)=(P21+P22)/(P11+P12+P21+P22) \quad (4)$$

That is, the input position coordinates (x, y), which should be recognized on the effective input area, can be calculated or specified uniquely using the load levels P11, P12, P21, and P22 which each strain gauge unit 2223 detects, like the above formulas (2) and (4).

A predetermined area of the effective input area is secured in the upper part of Y direction for a recognition area of the pressing-down manipulation to the manipulation knob 2012a. The residual area is secured as an input coordinate recognition area on the touch manipulation input surface 2120p. Therefore, when the input position coordinates (x, y) calculated using P11, P12, P21, and P22 are included in the input coordinate recognition area, the input position coordinates (x, y) can be transmitted to the navigation ECU 2200 as touch input position information on the touch manipulation input surface 2120p. Using of the touch input position information enables (i) position instruction on the map and (ii) manipulation recognition against a software button on a navigation operation window, for example, on the monitor 2015. In addition, when the drag manipulation is performed on the touch manipulation input surface 2120p while continuously touching it by a finger, a drag direction can be specified from the change in the touch input position information recognized every moment. For example, it can be used as instruction information such as a pull-down menu manipulation, a map scroll, etc.

In addition, when the calculated input position coordinates (x, y) are included in the recognition area for pressing-down manipulation, a recognition code of the pressing-down manipulation to the manipulation knob 2012a may be prepared separately from the information on input position coordinates (x, y) and transmitted to the navigation ECU 2200. In contrast, when the auxiliary strain gauge 2223j in FIG. 23 indicates a detection load level greater than a predetermined value, the pulling-up manipulation to the manipulation knob 2012a can be recognized. Thus, a pulling-up manipulation recognition code can be prepared and transmitted to the navigation ECU 2200. The pressing-down manipulation or pulling-up manipulation applied to the manipulation knob 2012a can be broadly utilized for instructions such as enlargement/reduction of map scales, zooming in/zooming out of monitor images.

Furthermore, there is a case that unintended touch is made mistakenly to the touch manipulation input surface 2120p or the manipulation knob 2012a. When such unintended slight touch is made, each of the absolute values of the detection load levels P11, P12, P21, and P22 of strain gauge units 2223 becomes small. In order to help prevent the problem that the apparatus responds to an input excessively sensitively, suitable reference value Pr (Pr1 or Pr2 to be mentioned later) is specified with respect to the detection load levels P11, P12, P21, and P22. Only when anyone of P11, P12, P21, and P22 exceeds Pr, the generation of the above input information is executed.

Figure 26:
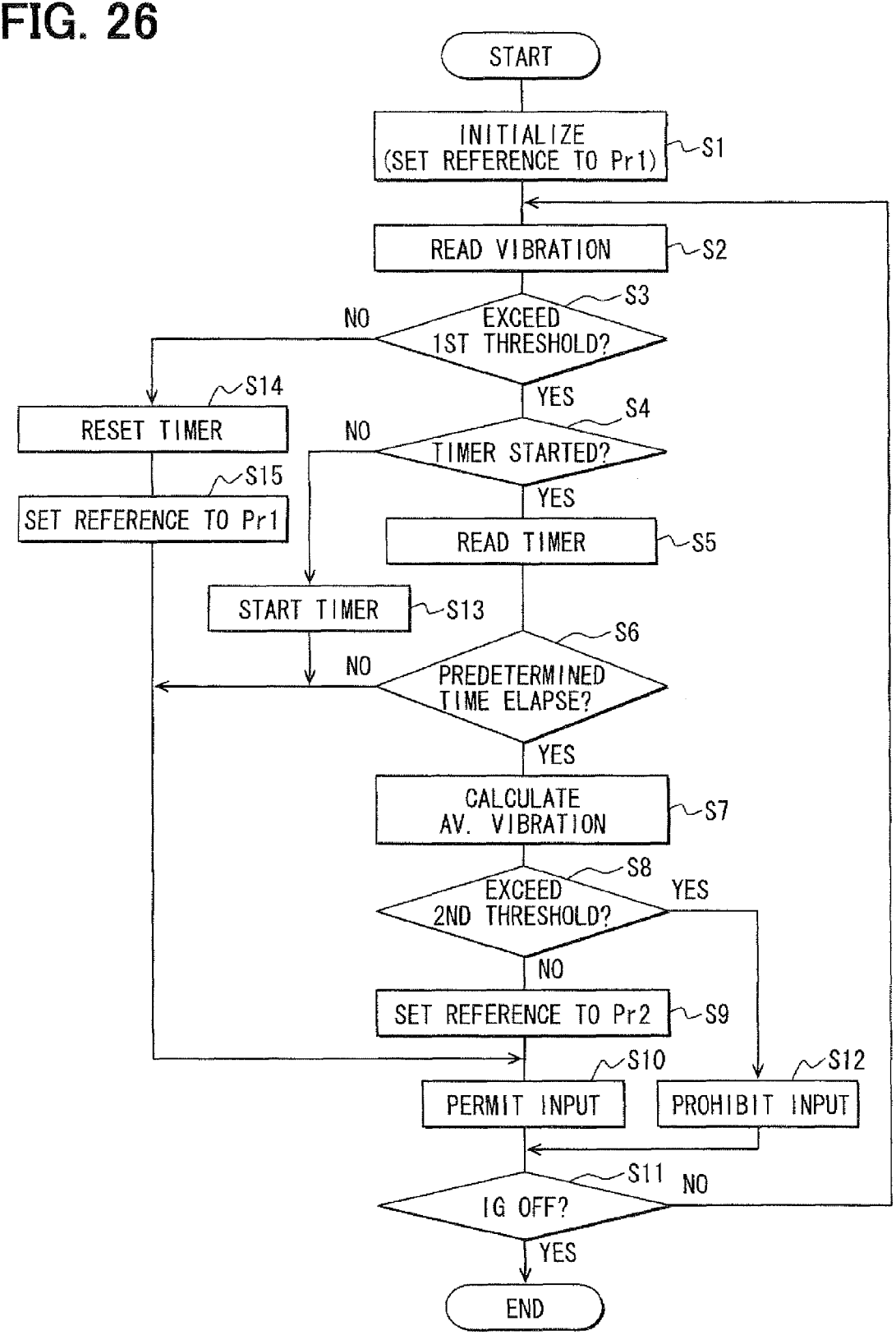
FIG. 26 is a flowchart diagram illustrating a process by an input control program according to the fifth embodiment.

Next, the following explains a flow of the process by the input control program 2103b with reference to a flowchart of FIG. 26. In S1, an initialization process is performed to reset a timer for measuring a vibration continuation time mentioned later, and set the above-mentioned input detection reference value to a first value Pr1 as a default value. The first value Pr1 is defined so as to preclude an unintended slight contact, which does not intend to perform for input, from input recognition when there is no vibration which should be taken into consideration. Next, in S2, the detection load level of predetermined one(s) of the four strain gauge units 2223 is read as a vibration level. The predetermined one(s) of the four strain gauge units 2223 may be alternatively designed, for instance, only one, two, three, or four. Further, when several units are used, an addition or average of the detection vibration values can be designated. In S3, the read vibration level is compared with a predetermined threshold value.

The threshold value relative to the vibration level is designated in two steps. The first threshold value signifies a lower limit for determining that the vibration level should be taken into consideration on the calculation of the input information. In contrast, the second threshold value is set higher than the first threshold value and signifies a lower limit for determining that the vibration level is too large to enable the normal input operation. The vibration level between the first threshold value and the second threshold value is regarded as an intermediate vibration level, for instance, to manage to enable the input operation even with a small vibration.

In S3, the vibration level is compared with the first threshold value. When the vibration level is not greater than the first threshold value, the processing proceeds to S14, where a timer is reset. In S15, the input detection reference value is set to the first value Pr1. The processing then advances to S10, where instruction of input permission is indicated to the position calculation program 2103a. The position calculation program 2103a adopts the first value Pr1 as an input detection reference value, and compares it with P11, P12, P21, and P22. Then, as explained above, when any one of P11, P12, P21, and P22 exceeds Pr1, the generation of the above input information is executed. This helps prevent the problem that the apparatus responds to an input excessively sensitively.

In contrast, in S3, when the vibration level is greater than the first threshold value, the processing proceeds to S4. At this time, the value of the vibration level is stored so as to be added in the RAM 2102 (in FIG. 24). In S4, it is determined whether the timer has been already started. If already started, the processing proceeds to S5, the timer value is read. In S6, it is determined whether the timer value elapses a predetermined period. If it elapses, it is determined that the high level vibration continues to the extent that it interferes with the input determination. The processing then proceeds to S7, where the average vibration level is calculated based on the value of the vibration level stored as being added up. Only the vibration levels exceeding the first threshold value are sampled, the calculated average vibration level becomes the value certainly exceeding the first threshold value.

In S8, the calculated average vibration level is compared with the second threshold value. When the average vibration level exceeds the second threshold value, the processing proceeds to S12, where the position calculation program 2103a is given an instruction of an input prohibition. In response to the input prohibition instruction, the position calculation program 2103a operates not to receive a series of input manipulation from the touch manipulation input surface 2120p. In addition, the calculation of the input position coordinates using the detection load levels P11, P12, P21, and P22 is not executed, either. In contrast, when the average vibration level does not exceed the second threshold value, the average vibration level is between the first threshold value and the second threshold value. The processing proceeds to S9, where the above-mentioned input detection reference value is changed from the first value Pr1 to a second value Pr2=Pr1+ delta P. In S10, the position calculation program 2103a is given an instruction of the input permission.

The position calculation program 2103a adopts the second value Pr2 as an input detection reference value, and compares it with P11, P12, P21, and P22. Thus, the input detection reference value is increased to the second value Pr2 in consideration of the continuation of the vibration. Thus, even if a load resulting from the slight contact which does not intend an input is biased by vibration, an incorrect recognition of such an intended input being effective can be prevented. When the timer has not been started in S4, the processing proceeds to S13, where the timer is started. The processing then proceeds to S10, where an instruction of the input permission is indicated to the position calculation program 2103a.

In S11, it is determined whether the ignition (IG) switch is turned off. If the ignition switch is not turned off, the processing returns to S2, where sampling or reading of the vibration levels are executed and the following processing is repeated. That is, the vibration level sampling in S2 is continuously repeated until the ignition switch is turned off. Generally, the continuation time of the touch manipulation for operating an apparatus is approximately one second at most. In order to distinguish between the load continuation due to the touch manipulation and the load continuation due to the vibration, it is desirable to set up an interval of the vibration level sampling to be shorter than $1/10$ of the touch manipulation continuation time. Any branch routine following S3 may be accompanied by a standby step, which is not shown in FIG. 26, so as to provide the above desirable interval, namely, to adjust the total execution time to the above interval. In such a case, among all the possible branch routines, the branch routine including the most execution steps other than a standby step determines the minimum applicable value of the sampling interval of the vibration level.

The following operation effect can be achieved by repeatedly executing processing following S2. First, that the timer is not started in S4 signifies that the vibration level changes to the state exceeding the first threshold value for the first time. Thus, the just preceding repeated cycles execute the branch routine from S3 to S14, S15; the input detection reference value is the first value Pr1. In addition, when in S6 the timer does not elapse the predetermined time, it is signified that the preceding repeated cycles did not proceed to S7 and its following processing. Thus, the branch routine proceeding to S15 is taken or repeated under the state that the vibration level exceeds the first threshold value; therefore, the input detection reference value continues to be the first value Pr1. That is, in both the above cases, on the assumption that the input detection reference value is the first value Pr1, the instruction of input permission is given to the position calculation program 2103a in S10. Therefore, even if the state where the vibration level exceeds the first threshold value is started, a series of input restriction control is not executed until the elapsed time reaches the predetermined time (for example, 5 seconds or more). The series of input restriction control include the input prohibition in S12, and raising to the second value Pr2 of the input detection reference value in S9.

In contrast, for instance, when the bad (unpaved) road travel is changed to the paved road travel, the vibration continuation state is solved. In such a case, in S3, the sampled vibration level changes to the state of being less than the first threshold value from the state of exceeding the first threshold value. As a result, the processing proceeds to S14 from S3, where the timer is reset. Then, in S15, the input detection reference value is set to the first value Pr1. Thereby, the series of input restriction control including the input prohibition in S12, and raising to the second value Pr2 of the input detection reference value in S9 can be cancelled.

In addition, after the state where the vibration level exceeds the first threshold value reaches the predetermined time in S6, the following takes place in the subsequent repeated cycles. If it is determined that the state of exceeding the first threshold value continues in S3, the timer is not reset unless the processing branches to S14. The timer value read in S5 maintains the state where the elapsed time exceeds the above predetermined time. Therefore, the input restriction control in S9 and S12 is continued. Furthermore, in the repeated cycles under the continuation of the input restriction, when the large and small relation between the average vibration level and the second threshold value is reversed in the comparison in S8, the contents of the input restriction changes between (i) the continuation of input permission by raising the input detection reference value to the second value Pr2 and (ii) prohibition of the input. It is noted that under the state where the large and small relation is frequently reversed for a short period of time, the input permission state is intermittently interrupted extremely to thereby possibly cause a kind of chattering. In such a case, it is desired to provide a fixed neutral zone in the comparison determination with the second threshold value. It may be desirable that the state of the input prohibition is held until the comparison result escapes from the neutral zone.

Furthermore, as illustrated by alternate long and short dash lines in FIG. 24, a dedicated vibration detection section 2132, for example, known piezoelectric ceramic element, may be provided independently of the strain gauge units 2223 included in the load detection section. For instance, it is desirable to arrange the vibration detection section 2132 as illustrated by broken lines in FIG. 23 in respect of preventing competition between the detected vibration and the manipulation load. That is, the vibration detection section 2132 is arranged to be deviated from the elastic beam member 2123, i.e., load transmission route from the manipulation member 2120 to the manipulation support section 2122. In FIG. 23, the vibration detection section 2132 is arranged on the manipulation support section 2122. In this case, the vibration level which should be detected in S2 of FIG. 26 is acquired as an input value from the vibration detection section 2132.

In addition, as the specific process of the input restriction, only either raising of the input detection reference value or the input prohibition may be adopted. In FIG. 26, when performing only raising of the input detection reference value, the processing in S7, S8, and S12 can be omitted. In addition, when only the input prohibition is adopted, a value equivalent to the second value is only used as the input detection reference value. Thus, the following steps or processing can be omitted: S1 to set the default value of the input detection reference value, S15 to return to the default value, and, furthermore, S7, S8 and S9. In addition, S10 is replaced by S12.

Figure 27:
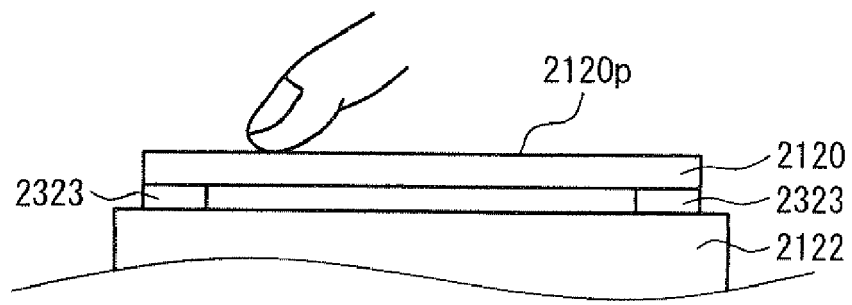
FIG. 27 is a view illustrating another example of a load detection section according to the fifth embodiment.
Figure 28:
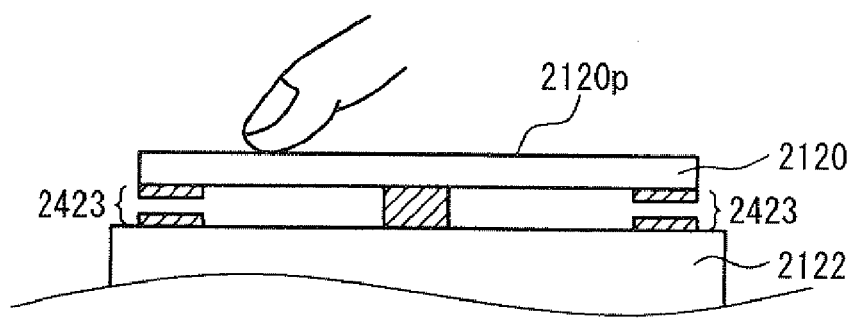
FIG. 28 is a view illustrating yet another example of a load detection section according to the fifth embodiment.

Furthermore, in the present embodiment, the load detection section is configured of the strain gauges; however, there is no need to be limited to the strain gauges. For example, as illustrated in FIG. 27, piezoelectric ceramic elements 2323 may be used. Alternatively, as illustrated in FIG. 28, electric capacity type load sensors 2423 can be also used.

The present embodiment intends to solve a problem of a conventional in-vehicle manipulation input apparatus such as a car navigation apparatus. In a conventional car navigation apparatus, for instance, similarly, the manipulation load to a input section is detected by a load sensor such as strain gauges, and the detection values are used for determining a manipulation position and direction.

However, as already explained in the above, under such a structure, when the continuous vibration is added to the vehicle during the driving on bad roads etc., the load sensor detects such vibration to thereby possibly undergo the mistaken manipulation input recognition. In addition, if the large vibration is added during the manipulation, a problem may arise that the manipulating hand or finger fails in pointing an aimed point to thereby cause the manipulation failure. In the present embodiment, such problems can be solved.

Each or any combination of processes, steps, or means explained in the above can be achieved as a software section or unit (e.g., subroutine) and/or a hardware section or unit (e.g., circuit or integrated circuit), including or not including a function of a related device; furthermore, the hardware section or unit can be constructed inside of a microcomputer.

Furthermore, the software section or unit or any combinations of multiple software sections or units can be included in a software program, which can be contained in a computer-readable storage media or can be downloaded and installed in a computer via a communications network.

(Aspects of Disclosure)

Aspects of the disclosure described herein are set out in the following clauses.

As an aspect of the disclosure, a panel member is provided to have a front surface exposed toward an outside, the front surface functioning as a manipulation input surface, on which a load is applied toward an inside of the panel member in association with an input by a touch manipulation. A load detection section is configured to detect a load, which is applied to the panel member. A calculation section is configured to calculate a load position, to which a load is applied, based on the load detected by the load detection section. A structural section is configured to apply a load orthogonally to the panel member toward the outside, the structural section being rigidly integrated with the panel member.

In the above manipulation input apparatus, the structural section is provided to able to apply an outward load (e.g., an upward load if the panel member is arranged horizontally) against the outside surface or front surface of the panel member whose outside surface functions as a manipulation input surface for receiving a touch manipulation input. Thus, the outward load (−Z direction) can be applied using or via the structural section; the load having the direction in which the panel member is pulled outward can be detected by the load detection section. That is, the above manipulation input apparatus allows the detection of the two directional loads, namely, both the load pressing inward the panel member (load of +Z direction) and the load pulling outward the panel member. Thereby, the load information of the ±Z directions can be effectively used, increasing the manipulation modes in the panel member.

As an optional aspect, the structural section may be further provided as a protruding portion (e.g., stick, knob, lever, convex portion) configured to be protruding from the front surface of the panel member; alternatively, the structural section may be further provided as a recess portion (e.g., notched portion) configured to be recessed in the panel member. When the structural section is a protruding portion, it can be held by a finger and pulled outwardly or frontwardly to thereby be able to apply an outward load to the panel member easily. When the structural section is a recess portion, it can be hooked by a finger and pulled outwardly or frontwardly to thereby be able to apply an outward load to the panel member easily. In addition, an inward load can be also applied to the panel member via the structural section.

As another aspect, the panel member may be further configured to have a rectangular shape. The load detection section may be further configured to include strain gauge sensors that are arranged respectively at corners of a rear surface of the panel member. Each of the strain gauge sensors may detect (i) a load corresponding to a quantity of a pulling-outward manipulation which is executed by pulling the panel member toward the outside using the structural section and (ii) a load corresponding to a quantity of an inclination manipulation which is executed by inclining the panel member to a direction of each of four sides of the rectangular panel member using the structural section.

When the panel member is pulled outward via the structural section, the load (load of −Z direction) which acts on the direction which pulls outward the panel member is detected by each strain gauge type sensor according to the quantity of the pulling-outward manipulation. In addition, when an inclination manipulation is performed via the structural section, based on the direction and the quantity of the inclination manipulation, two groups of the train gauge type sensors coexist: a first group is to detect the load (load of −Z direction) which acts on the direction which pulls outward the panel member; and a second group to detect the load (load of +Z direction) which acts on the direction which presses inward the panel member. Therefore, the quantity of pulling outward or pressing inward the panel member and the direction and the quantity of inclining the panel member can be calculated with sufficient accuracy by using the load detected from each strain gauge type sensor.

As an optional aspect, the manipulation input apparatus may further comprise an input information determination section configured to (i) select one of operation targets based on the inclination manipulation applied to the panel member using the structural section, and (ii) perform an adjustment of an output value of the selected operation target or switching of modes of the selected operation target, based on pulling-outward manipulation or pressing-inward manipulation applied to the panel member using the structural section. In such a case, it may be desirable that: the operation targets include at least one of an air blow quantity setting function in an air-conditioner, a temperature setting function, and a blow outlet switching function; the output value includes an air blow quantity when the air blow quantity setting function is selected, or a temperature when the temperature setting function is selected; and the modes include various kinds of blow outlet switching positions when the blow outlet switching function is selected. Further, alternatively, it may be desirable that: the operation targets include at least one of a CD reproduction function in an audio apparatus, a radio function, and an MP3 reproduction function; and the modes include indexes when the CD reproduction function is selected, reception channels when the radio function is selected, or reproduction files when the MP3 reproduction function is selected. Further, alternatively, it may be desirable that: the operation targets include a map display setting up function in a navigation apparatus; and the modes include scales of a map displayed when the map display setting up function is selected.

According to the above configuration, according to the inclination manipulation to the panel member via the structural section, any one of the operation targets can be selected. Further, this allows adjustment of an output value of the selected operation target or switching of modes therebetween of the selected operation target, based on manipulation applied to the panel member via the structural section in a direction orthogonal to the panel member. Thus, while increasing the manipulation modes relative to the panel member, the usability of the manipulation input apparatus can be conjointly enhanced.

As an optional aspect, in a case that a sum total of detection values from the strain gauge type sensors is equal to or greater than a predetermined value, a change speed of (i) the adjustment of the output value or (ii) the switching of modes may be set to be greater as compared with a case that the sum total of detection values is less than the predetermined value. Thus, the usability of the manipulation input apparatus can be raised further.

As an optional aspect, the structural section may be provided as a bias member arranged on a rear surface of the panel member for biasing the panel member toward the front surface functioning as the manipulation input surface of the panel member.

When the structural section is provided as the protruding portion from the manipulation input surface, or as the recess portion in the panel member, an upward load relative to the panel member is not applied without pulling outward the panel member via the structural section. In contrast, when the structural section is provided as a bias member arranged on a rear surface of the panel member for biasing the panel member toward the front surface, the outward load relative to the panel member can be applied unlike the above structural section as the protruding or recess portion.

Such a bias member may include (i) a dialing portion that passes through the rear surface and the front surface of the panel member, the dialing portion protruding from the front surface functioning as the manipulation input surface of the panel member, the dialing portion being for receiving a rotation manipulation to rotate around an axis orthogonal to the panel member, and (ii) a pressing portion that is attached to the dialing portion at one end, the pressing portion abutting on the rear surface at an other end for resiliently applying an outward load toward the front surface functioning as the manipulation input surface of the panel member. Herein a load position of the panel member, where an outward load is applied from the pressing portion via the rear surface of the panel member in association with the rotation manipulation to the dialing portion, may vary in a circumferential direction of the dialing portion.

Thus, according to the rotation manipulation of the dialing portion, a load position of the panel, where the outward load is applied, varies in a circumferential direction of the dialing portion. This configuration can achieve an operation device (for example, dial switch) of the new manipulation mode on the panel member using the rotation manipulation of the dialing portion.

Further, in the above configuration, the panel member may be configured to have a rectangular shape; the load detection section may be further configured to include strain gauge sensors that are arranged respectively at corners of the rear surface of the panel member; and each of the strain gauge sensors may detect a load corresponding to a quantity of the rotation manipulation to the dialing portion of the bias member.

Thus, when according to the rotation manipulation of the dialing portion, a load position of the panel, where the outward load is applied, varies in a circumferential direction of the dialing portion, each strain gauge type sensor detects a load different from that detected by another strain gauge type sensor, based on the change of the load (load of −Z direction) position which acts on the direction which presses inward the panel member. Therefore, the quantity of the rotation manipulation of the dialing member can be calculated with sufficient accuracy by using the load detected by each strain gauge type sensor. Herein, when a pressing-inward manipulation is performed to the panel member, the load (load of +Z direction) is applied. The direction of the pressing-outward load applied to the panel member from the pressing portion is reverse to the direction of the pressing-inward load applied via the pressing-inward manipulation to the panel member. The positive/negative of the load detection voltage detected by each strain gauge type sensor differs between the case, when the rotation manipulation of the dialing portion is carried out, and the case, when the pressing-inward manipulation to the panel member is carried out. Accordingly, each manipulation is clearly distinguishable.

As an optional aspect, the manipulation input apparatus may further comprise: an input information determination section configured to determine input information based on a quantity of the load detected by the load detection section, the input information including an input quantity which is related with information on quantity the input information determination section being further configured to determine the input quantity according to a magnitude of the load detected by the load detection section.

Under such configuration, when the operator performs a quantitative input by touching the manipulation input surface, the load detection section detects a quantity corresponding to the load due to the operator's pressing-inward manipulation and determines an input quantity according to the detected quantity of the load. When the operator needs to execute an input with a large input quantity, it is only required for the operator to increase a load which is applied based on the pressing-inward manipulation. Therefore, regardless of executing either an input with a large input quantity or an input with a small input quantity, the same manipulation procedure and the same input time are adopted. This configuration can provide the manipulation input apparatus to prevent a problem to increase the number of times of input manipulations or the manipulation input time when an input has a large input quantity.

Further, the input determination section may be further configured to determine the input information based on the load position on the manipulation input surface of the panel member calculated by the calculation section.

Since the position on the manipulation input surface which the operator touches is also detectable, the operation target can be simultaneously determined from the load position and pressing-inward load due to the operator's touch manipulation. Therefore, for example, when each position on the manipulation input surface is assigned to one of various operation targets, based on the load position and the load quantity due to the operator's touch manipulation input, it is determined which operation target is selected and what an input quantity is instructed with respect to the selected operation target. Therefore, when an input to select an operation target and an input to determine an input quantity of the selected operation target are required in a series or at the same time, instead of two input manipulations, only one input manipulation is necessary. Further, regardless of executing either an input with a large input quantity or an input with a small input quantity, the same manipulation procedure and the same input time can be adopted.

As an optional aspect, the calculation section may be further configured to determine a direction of a drag manipulation on the manipulation input surface of the panel member, based on the load detected by the load detection section when the drag manipulation being made as the touch manipulation to move in touch with the manipulation input surface of the panel member; and the input information determination section may be further configured to determine the input information based on the determined direction of the drag manipulation on the manipulation input surface.

Thus, the direction of the drug manipulation is detected, the input information can be determined from the direction of the drug manipulation and a load applied by the drag manipulation. Therefore, when executing an input of a direction and an input of a quantity with respect to a drag manipulation, instead of two input manipulations, only one input manipulation of a drag manipulation is necessary. Furthermore, regardless of executing either an input with a large input quantity or an input with a small input quantity, the same manipulation procedure and the same input time can be adopted.

As an optional aspect, the input information determination section may be further configured to include a first determination unit configured to determine the input quantity as a monotonically increasing function with respect to the load when the load exceeds a predetermined value.

That is, it can be determined that as a load quantity is increased, an input quantity is increased. Therefore, when inputting a large input quantity, the operator presses inward the manipulation input surface strongly. When inputting a small input quantity, the operator presses inward the manipulation input surface weakly. Thus, it is easy for the operator to understand how to execute a manipulation to achieve an intended purpose. By adopting such an easy understandable manipulation method, regardless of an input quantity being either large or small, only the same manipulation input time may be required.

Furthermore, the input information determination section may be further configured to include a second determination unit configured to determine the input quantity as a constant value when the load is within a range which does not exceed the predetermined value.

Herein, when the load quantity does not exceed the predetermined value, the input quantity is fixed to the steady value in a certain range at least. This is a conventional input manipulation. In conjunction with this configuration, when the load quantity exceeds the predetermined value, it is determined that the input quantity becomes large as the load quantity becomes large. Therefore, when inputting a large input quantity, the operator only presses inward the manipulation input surface strongly accordingly. Further, when inputting a small input quantity, it is determined that a fixed input quantity is instructed by pressing inward the manipulation input surface even weakly This helps prevent a difficulty in inputting a small input quantity by a very delicate feeling.

Further, the load detection section may be further configured to include strain gauges, fixedly attached to a rear surface of the panel member, respectively, to thereby detect the load.

By using the strain gauges attached to the rear surface opposite to the manipulation input surface, the input position, the input load quantity, and the drag direction can be detected with sufficient accuracy. Such a configuration requires only a single mechanism of the strain gauges, thereby providing an advantage to not need a high cost and complicated device.

Further, the input information may include a temperature setting and an air blow quantity setting in an air-conditioner.

Thus, in executing a quantitative input such as temperature setting or air blow quantity setting of the air-conditioner, when the operator needs to execute an input with a large input quantity, it is only required for the operator to increase a load which is applied to the manipulation input surface based on the pressing-inward manipulation. Therefore, even when greatly changing the set temperature or the set air blow quantity, the same manipulation procedure and input time as those necessary when slightly changing them can be used. This configuration can provide the air-conditioner to prevent a problem to increase the number of times of input manipulations or the manipulation input time when greatly changing an input quantity.

Further, the input information may include a manipulation input to scroll a map in a navigation apparatus.

In executing a quantitative input such as a map scroll in a navigation apparatus, when the operator needs to execute an input with a large input quantity, it is only required for the operator to increase a load which is applied to the manipulation input surface based on the pressing-inward manipulation. Therefore, when executing a scroll of a map for achieving a long distance, the same manipulation procedure and input time as those necessary when executing a scroll of a map for achieving a short distance can be also used. This configuration can provide the navigation apparatus to prevent a problem to increase the number of times of input manipulations or the manipulation input time when greatly scrolling a map for a long distance.

As an optional aspect, the manipulation input apparatus may be provided in a vehicle. Further, the apparatus may further comprise an input information generation section configured to generate input information based on the load detected by the load detection section and output the generated input information; a vibration detection section configured to detect a vibration applied to the panel member; and an output control section configured to amend or restrict an operation of the input information generation section based on a detection result of the vibration detection section. Furthermore, the manipulation input apparatus may further comprise: a manipulation support section configured to support the panel member by receiving the load applied to the panel member. Herein, the load detection section may further include several load detection units, each of which is configured to detect a load in one of several different load transmission routes. The load may be applied to the panel member and transmitted to the manipulation support section via the several different load transmission routes.

Under the above configuration, even when a vibration of a high level is added continuously, the failure or erroneous detection (or recognition) in the manipulation can be reduced.

A road surface vibration having a small amplitude or a sporadic vibration having a short continuity may not simply become a cause of a problem such as a mis-detection or a manipulation failure, alternatively, even if it become a cause of a problem, it can be avoidable comparatively easily by providing a known method such as signal filtering. Thus, furthermore, the output control section may be further configured to restrict an output of the generated input information by the input information generation section only when a state, where a vibration detection level exceeds a predetermined threshold value, continues equal to or greater than a fixed period. Therefore, only when the large vibration which certainly causes a problem occurs, the output of the input information is restricted. This helps prevent the troublesomeness that the restriction to the output of input information is executed sensitively with respect to even a small vibration which does not require a caution.

Furthermore, the output control section may be further configured to prohibit an output of the generated input information by the input information generation section when a vibration detection level exceeds a predetermined threshold value. This can help prevent a problem to recognize a large vibration or impact as an input manipulation mistakenly. For example, it is assumed that a hand touches the panel member when a vibration or impact occurs. In such a case, The above featured configuration can help prevent an occurrence of a problem that the operator performs a mis-manipulation in an undesired direction or stroke by the force due to the vibration or impact occurring.

Furthermore, the input information generation section may include a load level comparison section configured to compare a predetermined reference value with a detection load level of each of the several load detection units of the load detection section. Further, only when the detection load level exceeds the reference value, the input information generation section may output the generated input information. Thus, when the detection load level is lower than the reference value, a response to the input is stopped. For instance, when the panel member is incorrectly touched lightly or when a touch which does not intend an input is made, an excessively sensitive or incorrect response can be prevented in the apparatus. In cases that a detection load level is biased by the vibration or impact from the vehicle, a very slight contact or no actual contact may cause such an incorrect response. Thus, the above mentioned featured configuration can help prevent a problem that incorrect or improper input information which does not reflect true manipulation information is outputted by either vibration or impact.

In such a case, when the vibration detection level detected by the vibration detection section exceeds a first threshold value, the output control section may change the predetermined reference value compared by the load level comparison section so as to become a higher value than usual. When the vibration or impact greater than the predetermined level is added, the reference value can be changed so as to become higher than usual. Even if the detection load level is biased by the vibration or impact, a load margin for determining a load level resulting from the true manipulation can be secured by the plus portion when the reference value is raised; thus, the above-mentioned incorrect response can be effectively reduced.

Furthermore, when the vibration detection level detected by the vibration detection section exceeds a first threshold value, the output control section may change the reference value compared by the load level comparison section so as to become a higher value than usual; and when the vibration detection level exceeds a second threshold value higher than the first threshold value, the output control section may prohibit the output of the generated input information. Under such a configuration, in a vibration having an intermediate level, in which even if there is a slight vibration, the input manipulation itself can be effective (namely, in a range between the first threshold value and the second threshold value), the input recognition process is continued while preventing the above-mentioned incorrect response by raising the reference value. In contrast, in a vibration having a high level, in which the input manipulation cannot be effective, (namely, greater than the second threshold value), the output itself of the input information is prohibited. This can help prevent a problem that incorrect input information flows outwardly indiscriminately.

Furthermore, at least one of the several load detection units of the load detection section may be used also as the vibration detection section. In contrast, the vibration detection section may be provided independent of the load detection section in a position apart from the several load transmission routes starting with the panel member ending with the manipulation support section.

It will be obvious to those skilled in the art that various changes may be made in the above-described embodiments of the present invention. However, the scope of the present invention should be determined by the following claims.

What is claimed:

1. A manipulation input apparatus comprising:
   a panel member having a front surface exposed toward an outside, the front surface functioning as a manipulation input surface, on which a load is applied toward an inside of the panel member in association with an input by a touch manipulation;
   a load detection section configured to detect a load, which is applied to the panel member;
   a calculation section configured to calculate a load position, to which a load is applied, based on the load detected by the load detection section; and
   a structural section configured to apply a load to the panel member toward the outside, the structural section being integrated with the panel member,
   wherein:
   the load detection section is further configured to include strain gauge sensors that are arranged respectively at four points of a rear surface of the panel member, the four points forming a rectangle; and
   each of the strain gauge sensors detects (i) a load corresponding to a quantity of a pulling-outward manipulation which is executed by pulling the panel member toward the outside using the structural section and (ii) a load corresponding to a quantity of an inclination manipulation which is executed by inclining the panel member to a direction of each of four sides of the rectangle formed by the four points using the structural section.

2. The manipulation input apparatus according to claim 1, the structural section being further provided as a protruding portion configured to be protruding from the front surface of the panel member.

3. The manipulation input apparatus according to claim 1, the structural section being further provided as a recess portion configured to be recessed in the panel member.

4. The manipulation input apparatus according to claim 1, further comprising:
   an input information determination section configured to
      (i) select one of operation targets based on the inclination manipulation applied to the panel member using the structural section, and
      (ii) perform an adjustment of an output value of the selected operation target or switching of modes of the selected operation target, based on pulling-outward manipulation or pressing-inward manipulation applied to the panel member using the structural section.

5. The manipulation input apparatus according to claim 4, wherein:
   in a case that a sum total of detection values from the strain gauge type sensors is equal to or greater than a predetermined value, a change speed of (i) the adjustment of the output value or (ii) the switching of modes is set to be greater as compared with a case that the sum total of detection values is less than the predetermined value.

6. The manipulation input apparatus according to claim 4, wherein:
   the operation targets include at least one of an air blow quantity setting function in an air-conditioner, a temperature setting function, and a blow outlet switching function; the output value includes an air blow quantity when the air blow quantity setting function is selected, or a temperature when the temperature setting function is selected; and the modes include various kinds of blow outlet switching positions when the blow outlet switching function is selected.

7. The manipulation input apparatus according to claim 4, wherein:
the operation targets include at least one of a CD reproduction function in an audio apparatus, a radio function, and an MP3 reproduction function; and
the modes include indexes when the CD reproduction function is selected,
reception channels when the radio function is selected, or reproduction files when the MP3 reproduction function is selected.

8. The manipulation input apparatus according to claim 4, wherein:
the operation targets include a map display setting up function in a navigation apparatus; and
the modes include scales of a map displayed when the map display setting up function is selected.

9. A manipulation input apparatus comprising:
a panel member having a front surface exposed toward an outside, the front surface functioning as a manipulation input surface, on which a load is applied toward an inside of the panel member in association with an input by a touch manipulation;
a load detection section configured to detect a load, which is applied to the panel member;
a calculation section configured to calculate a load position, to which a load is applied, based on the load detected by the load detection section; and
a structural section configured to apply a load to the panel member toward the outside, the structural section being integrated with the panel member,
wherein:
the panel member is further configured to have a rectangular shape;
the load detection section is further configured to include strain gauge sensors that are arranged respectively at corners of a rear surface of the panel member; and
each of the strain gauge sensors detects (i) a load corresponding to a quantity of a pulling-outward manipulation which is executed by pulling the panel member toward the outside using the structural section and (ii) a load corresponding to a quantity of an inclination manipulation which is executed by inclining the panel member to a direction of each of four sides of the rectangular panel member using the structural section.

10. The manipulation input apparatus according to claim 9, the structural section being further provided as a protruding portion configured to be protruding from the front surface of the panel member.

11. The manipulation input apparatus according to claim 9, the structural section being further provided as a recess portion configured to be recessed in the panel member.

12. The manipulation input apparatus according to claim 9, further comprising:
an input information determination section configured to
(i) select one of operation targets based on the inclination manipulation applied to the panel member using the structural section, and
(ii) perform an adjustment of an output value of the selected operation target or switching of modes of the selected operation target, based on pulling-outward manipulation or pressing-inward manipulation applied to the panel member using the structural section.

13. The manipulation input apparatus according to claim 12, wherein:
in a case that a sum total of detection values from the strain gauge type sensors is equal to or greater than a predetermined value, a change speed of (i) the adjustment of the output value or (ii) the switching of modes is set to be greater as compared with a case that the sum total of detection values is less than the predetermined value.

14. The manipulation input apparatus according to claim 12, wherein:
the operation targets include at least one of an air blow quantity setting function in an air-conditioner, a temperature setting function, and a blow outlet switching function;
the output value includes an air blow quantity when the air blow quantity setting function is selected, or a temperature when the temperature setting function is selected; and
the modes include various kinds of blow outlet switching positions when the blow outlet switching function is selected.

15. The manipulation input apparatus according to claim 12, wherein:
the operation targets include at least one of a CD reproduction function in an audio apparatus, a radio function, and an MP3 reproduction function; and
the modes include indexes when the CD reproduction function is selected, reception channels when the radio function is selected, or reproduction files when the MP3 reproduction function is selected.

16. The manipulation input apparatus according to claim 12, wherein:
the operation targets include a map display setting up function in a navigation apparatus; and
the modes include scales of a map displayed when the map display setting up function is selected.

* * * * *